United States Patent
Abdallah et al.

(10) Patent No.: US 10,171,343 B2
(45) Date of Patent: Jan. 1, 2019

(54) ROUTING MULTIPLE DATA STREAMS SIMULTANEOUSLY IN WIRELESS NETWORKS

(71) Applicant: SONY CORPORATION, Tokyo (JP)

(72) Inventors: Ramy Abdallah, San Jose, CA (US); Kazuyuki Sakoda, Campbell, CA (US)

(73) Assignee: SONY CORPORATION, Tokyo (JP)

( * ) Notice: Subject to any disclaimer, the term of this patent is extended or adjusted under 35 U.S.C. 154(b) by 72 days.

(21) Appl. No.: 15/387,338

(22) Filed: Dec. 21, 2016

(65) Prior Publication Data
US 2018/0176119 A1    Jun. 21, 2018

(51) Int. Cl.
| | | |
|---|---|---|
| *H04L 12/721* | (2013.01) |
| *H04W 40/24* | (2009.01) |
| *H04L 12/707* | (2013.01) |
| *H04B 7/0413* | (2017.01) |
| *H04W 84/18* | (2009.01) |
| *H04W 40/12* | (2009.01) |
| *H04L 12/735* | (2013.01) |

(52) U.S. Cl.
CPC .......... *H04L 45/12* (2013.01); *H04B 7/0413* (2013.01); *H04L 45/24* (2013.01); *H04W 40/246* (2013.01); *H04L 45/1283* (2013.01); *H04W 40/12* (2013.01); *H04W 84/18* (2013.01)

(58) Field of Classification Search
None
See application file for complete search history.

(56) References Cited

U.S. PATENT DOCUMENTS

| | | | | |
|---|---|---|---|---|
| 6,961,310 B2* | 11/2005 | Cain | ...................... | H04L 45/02 370/238 |
| 7,155,518 B2* | 12/2006 | Forslow | .............. | H04L 12/4641 709/227 |
| 7,720,169 B2* | 5/2010 | Reuven | ............. | H04L 25/03318 375/267 |
| 7,898,979 B2* | 3/2011 | Isozu | ...................... | H04L 45/26 370/227 |

(Continued)

OTHER PUBLICATIONS

Siraj, Mohammad, "A Survey on Routing Algorithms and Routing Metrics for Wireless Mesh Networks", World Applied Sciences Journal 30 (7): 870-886, 2014.

(Continued)

*Primary Examiner* — Gregory B Sefcheck
(74) *Attorney, Agent, or Firm* — O'Banion & Ritchey LLP; John P. O'Banion

(57) ABSTRACT

A method and apparatus for routing multiple data streams simultaneously through independent routes between multiple-input-multiple-output (MIMO) stations in a mesh network. The disclosed feature allows transmission of multiple data streams via multiple routes from a source station (STA) to a destination station (STA), which are both MIMO capable, even though the relay STAs in between can be a single-input-single-output (SISO) STA. An extended routing request (RREQ) and routing reply (RREP) frames are utilized which provide a primary and secondary flag indication, which is utilized in combination with advanced programming for setting path cost metrics to assure independence of primary and secondary routes.

20 Claims, 17 Drawing Sheets

(56) References Cited

U.S. PATENT DOCUMENTS

| | | | |
|---|---|---|---|
| 7,961,626 B2* | 6/2011 | Reeve | H04L 45/00 370/235 |
| 7,961,646 B2 | 6/2011 | Liu et al. | |
| 8,059,544 B2* | 11/2011 | Yi | H04L 45/00 370/236 |
| 8,064,377 B2* | 11/2011 | Yi | H04L 12/1877 370/252 |
| 8,315,231 B2* | 11/2012 | Pirzada | H04W 40/28 370/334 |
| 8,451,807 B2* | 5/2013 | Yi | H04L 45/124 370/338 |
| 8,467,297 B2 | 6/2013 | Liu et al. | |
| 8,908,670 B2 | 12/2014 | Bahr et al. | |
| 9,030,939 B2* | 5/2015 | Hui | H04W 40/023 370/241 |
| 9,253,015 B2* | 2/2016 | Girard | H04L 45/245 |
| 9,608,702 B2* | 3/2017 | Daniel | H04B 7/0413 |
| 9,787,385 B2* | 10/2017 | Tarlazzi | H04B 7/024 |
| 9,794,876 B2* | 10/2017 | Choi | H04W 76/28 |
| 9,930,561 B2* | 3/2018 | Boodannavar | H04W 28/0231 |
| 2004/0029553 A1* | 2/2004 | Cain | H04L 45/02 455/403 |
| 2009/0228575 A1* | 9/2009 | Thubert | H04L 45/128 709/220 |
| 2010/0246480 A1* | 9/2010 | Aggarwal | H04L 45/123 370/328 |
| 2018/0020389 A1* | 1/2018 | Abdallah | H04W 40/02 |

OTHER PUBLICATIONS

Campista, Miguel Elias M. et al., "Routing Metrics and Protocols for Wireless Mesh Networks", IEEE Network, vol. 22, No. 1, pp. 6-12, Jan.-Feb. 2008, Jan. 21, 2008, pp. 1-30.

Middha, Er. Sheenam et al., "Channel Assignment with Greedy Algorithm for Wireless Mesh Network", International Journal of Modern Computer Science and Applications (IJMCSA), vol. No. 3, Issue No. 3, Aug. 2015, pp. 21-26.

Kushwaha, Uday Singh et al., "AOMDV routing algorithm for Wireless Mesh Networks with local repair (AOMDV-LR)", IEEE 2014 International Conference on Communications and Signal Processing (ICCSP), Apr. 3-5, 2014, pp. 818-822.

European Patent Office (EPO), International Search Report and Written Opinion dated Nov. 17, 2017, related PCT international application No. PCT/US2017/049042, pp. 1-13, with claims searched, pp. 14-19.

Wei, Wei et al., "Interference Aware Multipath Selection for Video Streaming in Wireless Ad Hoc Networks", IEEE Transactions on Circuits and Systems for Video Technology, vol. 19, No. 2, Feb. 2009, pp. 165-178.

\* cited by examiner

Extended RREQ IE

Extended RREP IE

ROUTING MULTIPLE DATA STREAMS SIMULTANEOUSLY IN WIRELESS NETWORKS

CROSS-REFERENCE TO RELATED APPLICATIONS

Not Applicable

STATEMENT REGARDING FEDERALLY SPONSORED RESEARCH OR DEVELOPMENT

Not Applicable

INCORPORATION-BY-REFERENCE OF COMPUTER PROGRAM APPENDIX

Not Applicable

NOTICE OF MATERIAL SUBJECT TO COPYRIGHT PROTECTION

A portion of the material in this patent document may be subject to copyright protection under the copyright laws of the United States and of other countries. The owner of the copyright rights has no objection to the facsimile reproduction by anyone of the patent document or the patent disclosure, as it appears in the United States Patent and Trademark Office publicly available file or records, but otherwise reserves all copyright rights whatsoever. The copyright owner does not hereby waive any of its rights to have this patent document maintained in secrecy, including without limitation its rights pursuant to 37 C.F.R. § 1.14.

BACKGROUND

1. Technical Field

The technology of this disclosure pertains generally to routing data streams in a wireless network, and more particularly to routing multiple data streams in mesh networks via multiple routes.

2. Background Discussion

Multiple-input-multiple-output (MIMO) capability is widely utilized in point-to-point links in modern wireless networks. Advances in circuit design have enabled stations in wireless networks to embody advanced signal processing capabilities, such as multiple-input-multiple-output (MIMO) transmission and reception. MIMO and multi-user (MU)-MIMO allow transmission and reception of multiple data streams simultaneously.

However, routing protocols in modern mesh networks do not handle the routing of multiple data streams from a MIMO capable source STA to a MIMO capable destination STA. State-of-the-art mesh protocols, such as ad-hoc on-demand distance vector (AODV), are unable to take advantage of MIMO capability in the source and destination STAs to improve data transmission throughput.

Accordingly, methods are needed for discovering multiple routes to the destination to allow forwarding multiple and independent spatial data streams in a mesh network. The technology of this disclosure provides this functionality while overcoming shortcomings of previous routing protocols.

BRIEF SUMMARY

This disclosure describes a method and apparatus for routing of multiple data streams simultaneously through independent routes between multiple-input-multiple-output (MIMO) stations in a mesh network. The disclosed feature allows transmission of multiple data streams via multiple routes from a source station (STA) to a destination station (STA), both are MIMO capable, even though the relay STAs in between can be a single-input-single-output (SISO) STA.

Routing protocols specify how different network STAs communicate with each other, disseminating information that enables them to select routes between any two STAs on the network (e.g., ad-hoc network, mesh network, etc.). This disclosure provides methods and apparatus on routing multiple data streams via independent routes simultaneously.

Benefits of the technology presented herein may include but are not limited to the following: (a) A new route discovery message format, extended routing request (RREQ) and extended routing reply (RREP); (b) Performing primary and secondary path discovery; (c) Adjustment of a path cost metric according to the signal processing capability of a STA on that path; (d) Identifying the independence of a secondary path segment with respect to the primary path; and (e) Adjustment of the path cost metric according to independence of the secondary path segment with respect to the primary path.

The technology focuses on a mesh networking application which can be applied to wireless LAN (WLAN), wireless personal area networks (WPAN), and outdoor wireless communications. Thus, the target applications are wide-ranging, and include but are not limited to: Wi-Fi like networks, Internet of things (IoT) applications, backhauling of data by mesh networking, next generation cellular networks with D2D communications, 802.11 networks, and the like. The technology is particularly well-suited for use with IEEE802.11s and IEEE 802.15.4 (ZigBee).

A number of terms are found in the disclosure whose meanings are generally utilized as described below.

AODV: Ad-hoc On-Demand Distance Vector, a routing protocol for data packets in ad-hoc wireless networks.

D2D: Device-to-device communications.

Mesh networks: In a mesh network topology each node relays data for the network, and all mesh nodes cooperate in the distribution of data in the network. Mesh networks are a type of an ad-hoc (spontaneous, impromptu, or on-the-fly construction) network.

MIMO: Multiple Input Multiple Output; communications between two devices with multiple streams of data.

MU-MIMO: Multi-User Multiple Input Multiple Output; communications between a device and two or more nodes with single or multiple streams of data per node.

Multicast: In networking, is a one-to-many form of group communication implemented at layers above physical layer where information is addressed to a group of destination STAs simultaneously.

P2P: Peer-to-peer (P2P) communications arise when two or more stations are connected and share resources without going through a separate controller/server. A P2P network can be an ad hoc connection.

RREQ: Routing Request, a packet used in data routing protocols to discover the path between the source STA and the destination STA.

RREP: Routing Reply, a packet transmitted in response to RREQ in routing protocols. Upon reception of RREP by source STA it can start transmitting the data packets.

SISO: Single Input Single Output; communications between two devices with single stream of data.

STA: Station; a logical entity that is a singly addressable instance of a medium access control (MAC) and physical layer (PHY) interface to the wireless medium (WM).

Unicast: In networking, unicast is a one-to-one connection between two STAs.

Further aspects of the technology described herein will be brought out in the following portions of the specification, wherein the detailed description is for the purpose of fully disclosing preferred embodiments of the technology without placing limitations thereon.

BRIEF DESCRIPTION OF THE SEVERAL VIEWS OF THE DRAWING(S)

The technology described herein will be more fully understood by reference to the following drawings which are for illustrative purposes only:

DETAILED DESCRIPTION

1. Introduction

The technology of this disclosure provides a mechanism for routing multiple data streams simultaneously along independent routes between multiple-input-multiple-output (MIMO) stations in wireless networks. New mechanisms are provided for communications between the stations (STAs) on the network and for routing traffic.

2. State of the Art AODV Routing Summary

Ad-hoc on-demand distance vector (AODV) is a routing protocol to establish an end-to-end communication route through multiple hop relaying. Using AODV, the route from a source STA to a destination STA is determined by the following procedure. (a) Source STA transmits RREQ frames in multicast fashion. (b) Intermediate STAs propagate the RREQ frames in multicast fashion. (c) Destination STA replies back with RREP frame toward the source STA in unicast fashion, while remembering the next-hop STA. (d) Intermediate STAs propagate the RREP toward the source STA in unicast fashion, while remembering the next-hop STAs. (e) Upon reception of the RREP frame, the source STA remembers the next-hop STA, and starts data communication using the route procedure by RREQ/RREP handshaking.

3. Example Topology

Figure 1:
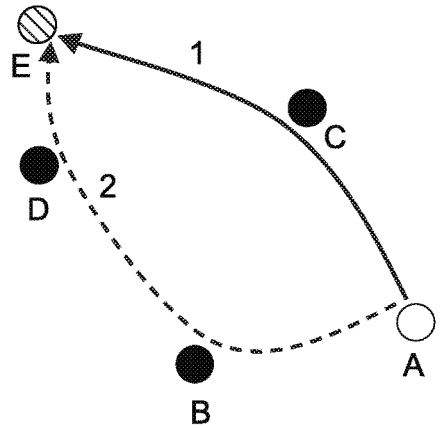
FIG. 1 is a topology diagram of an example wireless network having multiple peer nodes within which simultaneous routing paths are determined according to an embodiment of the technology of this disclosure.

FIG. 1 illustrates an example network topology in which a source STA has MIMO capability and is able to transmit two independent data streams via spatial multiplexing. In the figure there are five stations (STAs) shown A, B, C, D, and E with two routing paths 1 and 2 from STA A to STA E.

In the following discussion, a mesh network is considered in which at least some of the STAs embody MIMO capabilities. The disclosed embodiment describes a method to discover both a primary and a secondary path from the source STA to the destination STA. The source STA can utilize both paths to transmit two spatial data streams to the destination simultaneously.

Figure 2:
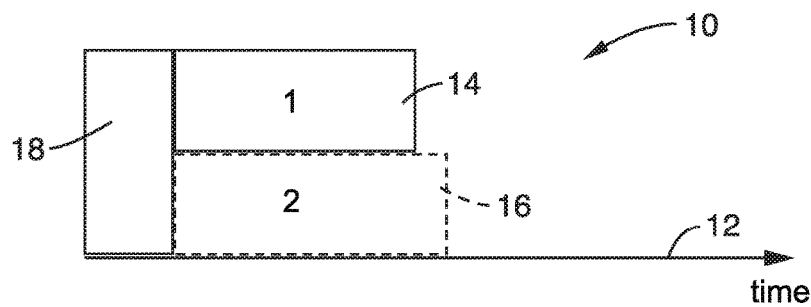
FIG. 2 is an air-time diagram for a first and second path from a source station (STA) to a destination station (STA).

FIG. 2 illustrates air-time for MIMO stream transmission from a source STA to a destination STA. Air times on time line 12 are seen for a first path 14, and a second path 16, with the path discovery overhead time 18 depicted. The disclosed routing protocol can provide significant air-time savings, by sending different data simultaneously along two paths.

4. Elements of the Routing Protocol

The routing protocol described herein is based on a state-of-the-art AODV routing protocol but can utilize any other mesh networking routing protocol as its base.

Figure 3:
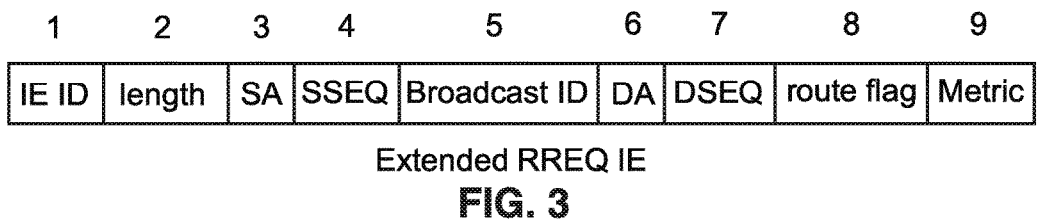
FIG. 3 is a data field diagram of an extended routing request (RREQ) utilized according to an embodiment of the technology of this disclosure.
Figure 4:
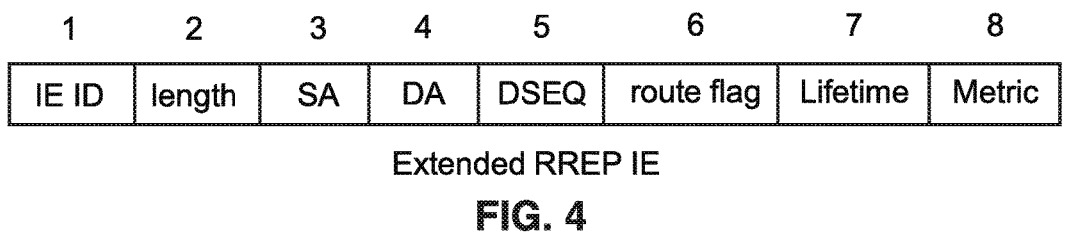
FIG. 4 is a data field diagram of an extended routing reply (RREP) utilized according to an embodiment of the technology of this disclosure.

FIG. 3 and FIG. 4 illustrate an extended routing request (RREQ) IE and the extended routing reply (RREP) information element (IE), respectively. In FIG. 3 the RREQ fields are depicted as follows:

1: IE ID—a sequence identifier of specific RREQ for this source;
2: length—length of the RREQ IE;
3: SA—source address;
4: SSEQ—source sequence number associated to the route;
5: Broadcast ID—incremented for each RREQ by source;
6: DA—destination address;
7: DSEQ—destination sequence number associated to the route;
8: Route Flag—flag indicating primary or secondary route; and
9: Metric—path cost metrics.

In FIG. 4, fields of the routing reply (RREP) IE are as follows:
1: IE ID—a sequence identifier of specific RREP for this destination;
2: length—length of the RREQ IE;
3: SA—source address;
4: DA—destination address;
5: DSEQ—destination sequence number associated to the route;
6: Route Flag—flag indicating primary or secondary route;
7: Lifetime—time which route is valid;
8: Metric—path cost metrics.

In both of these elements a new message; the route flag, is added. The route flag is a one bit of information that indicates a primary or a secondary route for either the extended RREQ or RREP IE.

Also, as with any information element, a distinct IE ID is used for this extended RREQ and extended RREP. This allows any STA receiving these packets to recognize them from the (regular) RREQ and RREP packets of the state-of-the-art AODV protocol.

5. Routing Protocol Description

5.1. Overview of Protocol Operation.

Figure 5A:
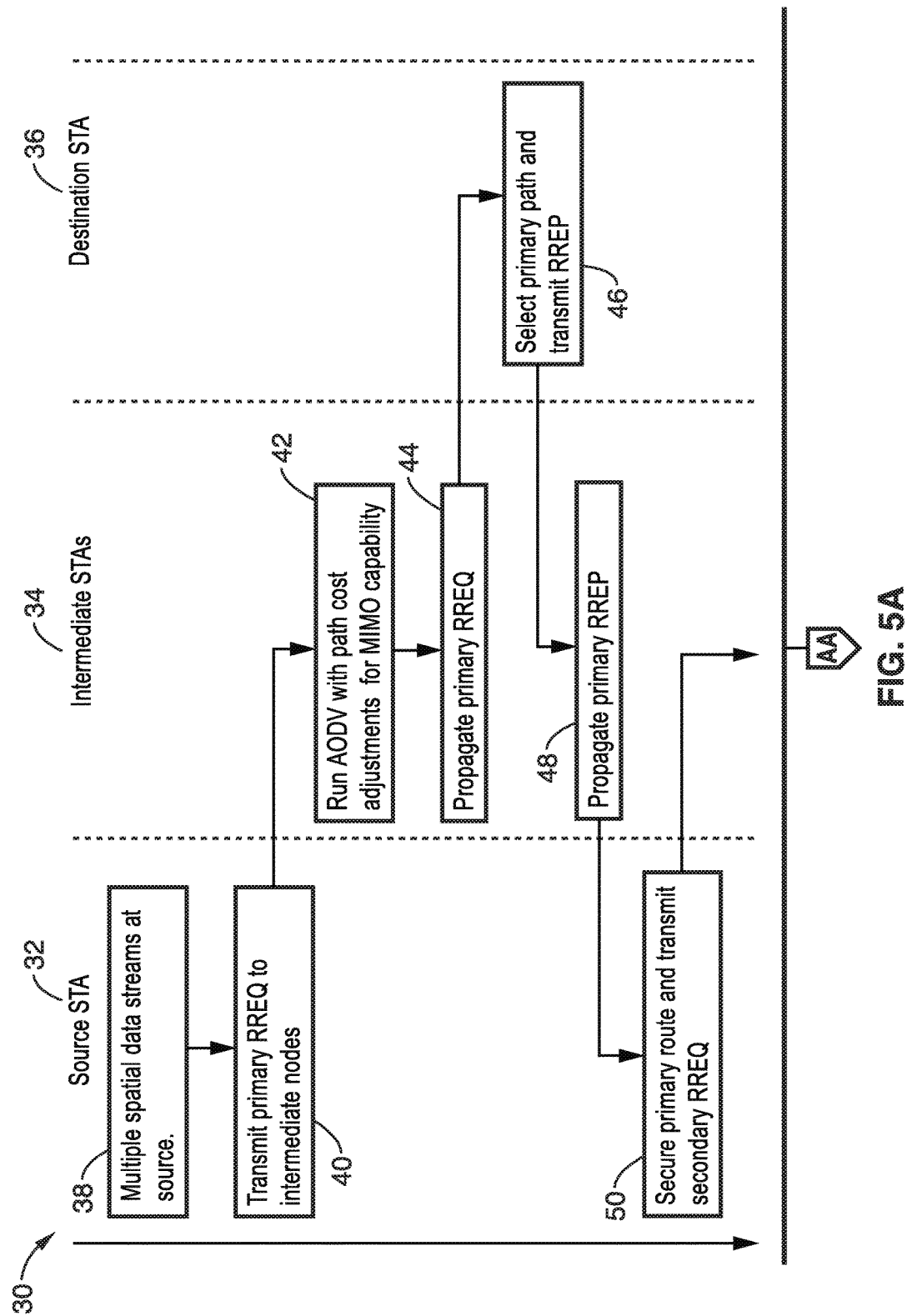
FIG. 5A and FIG. 5B are a flow diagram-timeline of wireless data routing using the extended RREQ and RREP seen in FIG. 3 and FIG. 4, as utilized according to an embodiment of the technology of this disclosure.
Figure 5B:
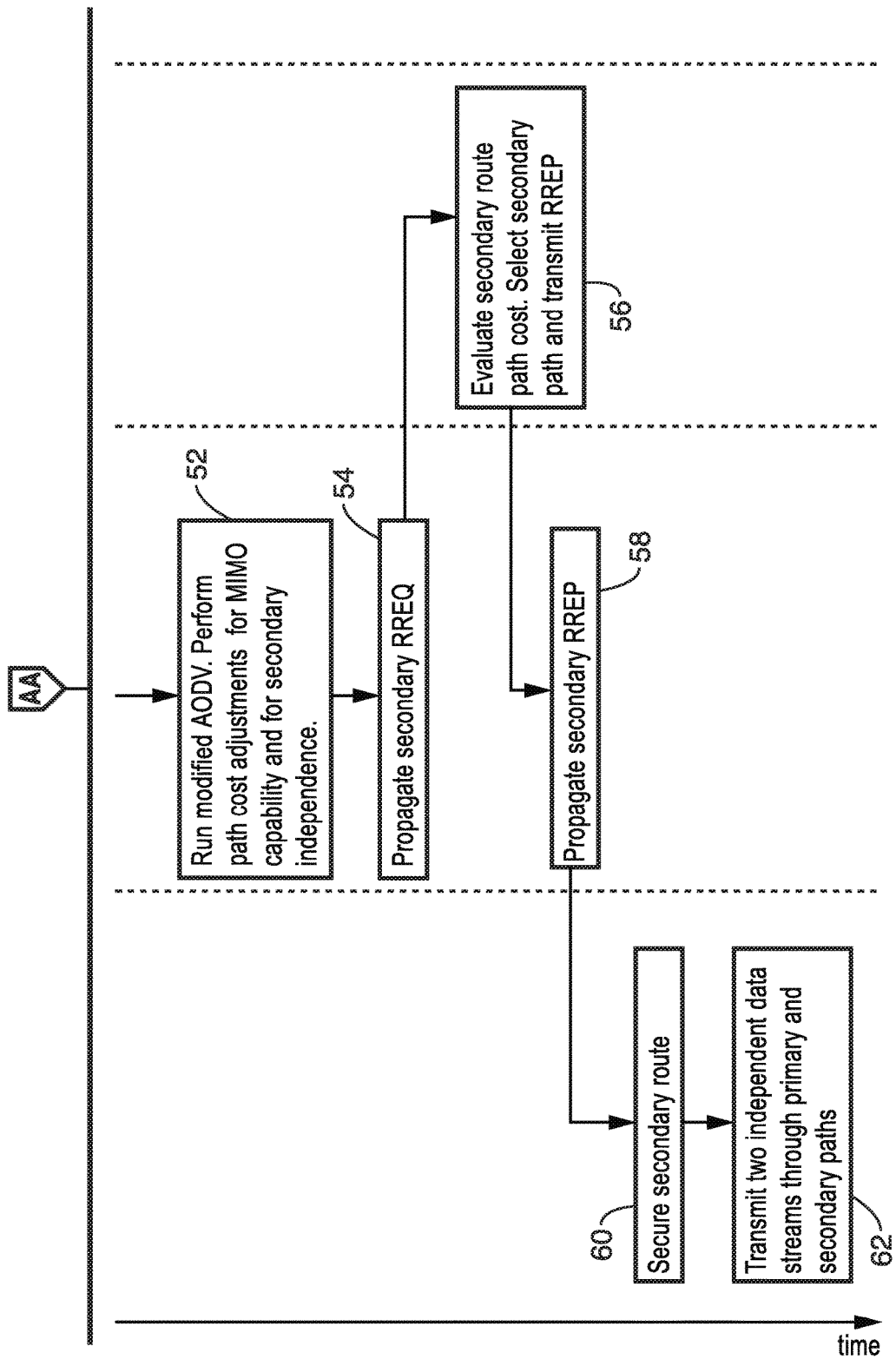

FIG. 5A and FIG. 5B illustrates a timeline as an example 30 of this routing using the extended RREQ/RREP formats. Operations are shown for the source STA 32, intermediate STAs 34, and destination STA 36. The protocol is triggered by the source STA 32. If the source STA has multiple spatial data streams 38, it starts the routing protocol by broadcasting an extended RREQ 40 with its route flag set to primary. The rules for the primary route at the source STA, destination STA and the intermediate STAs (possible relays) follow those of the baseline routing protocol, which by way of example and not limitation is AODV in this example embodiment, except for path metric cost adjustment due to MIMO capability.

At block 42 an intermediate node, which is MIMO capable, will weigh its path cost favorably, and propagate the primary RREQ 44, to destination STA 36 which selects primary path and transmits RREP 46 back toward source, which is picked up by intermediate STA 34 which propagates the RREP 48 to source STA 32.

After the primary route is secured 50, the source STA triggers the path discovery of a secondary route by broadcasting an extended RREQ 50 with its route flag set to secondary. The intermediate STAs and the destination STA will deal differently with the secondary RREQ. They employ certain rules which encourage the following. (a) The inclusion of MIMO STAs on the primary and secondary route to be able to use advanced physical layer MIMO communications schemes, such as spatial multiplexing and MU-MIMO. (b) Discovering of an end-to-end route that is not overlapped with the primary route.

In the figure the intermediate STA runs a modified AODV and performs cost adjustments for MIMO capability and for secondary independence 52 (FIG. 5B), then propagates this secondary RREQ 54 to destination STA 36 which evaluates 56 the secondary route path cost, selects a secondary path and transmits RREP 56, which is propagated 58 from the intermediate STA(s) to source STA, which secures 60 the secondary route. After securing the secondary route, the source STA transmits 62 two independent data streams through primary and secondary paths. Thus, upon securing a primary and possibly a secondary route, a source STA can transmit data on both routes simultaneously.

It should be appreciated that a secondary route which is independent from the primary route is not guaranteed to be present.

5.2 Path Discovery

FIG. 6A through FIG. 10 illustrate example embodiments of a path discovery mechanism is based on a modification of AODV path discovery. The modifications being configured to enable the routing protocol to discover independent primary and secondary routes.

Figure 6A:
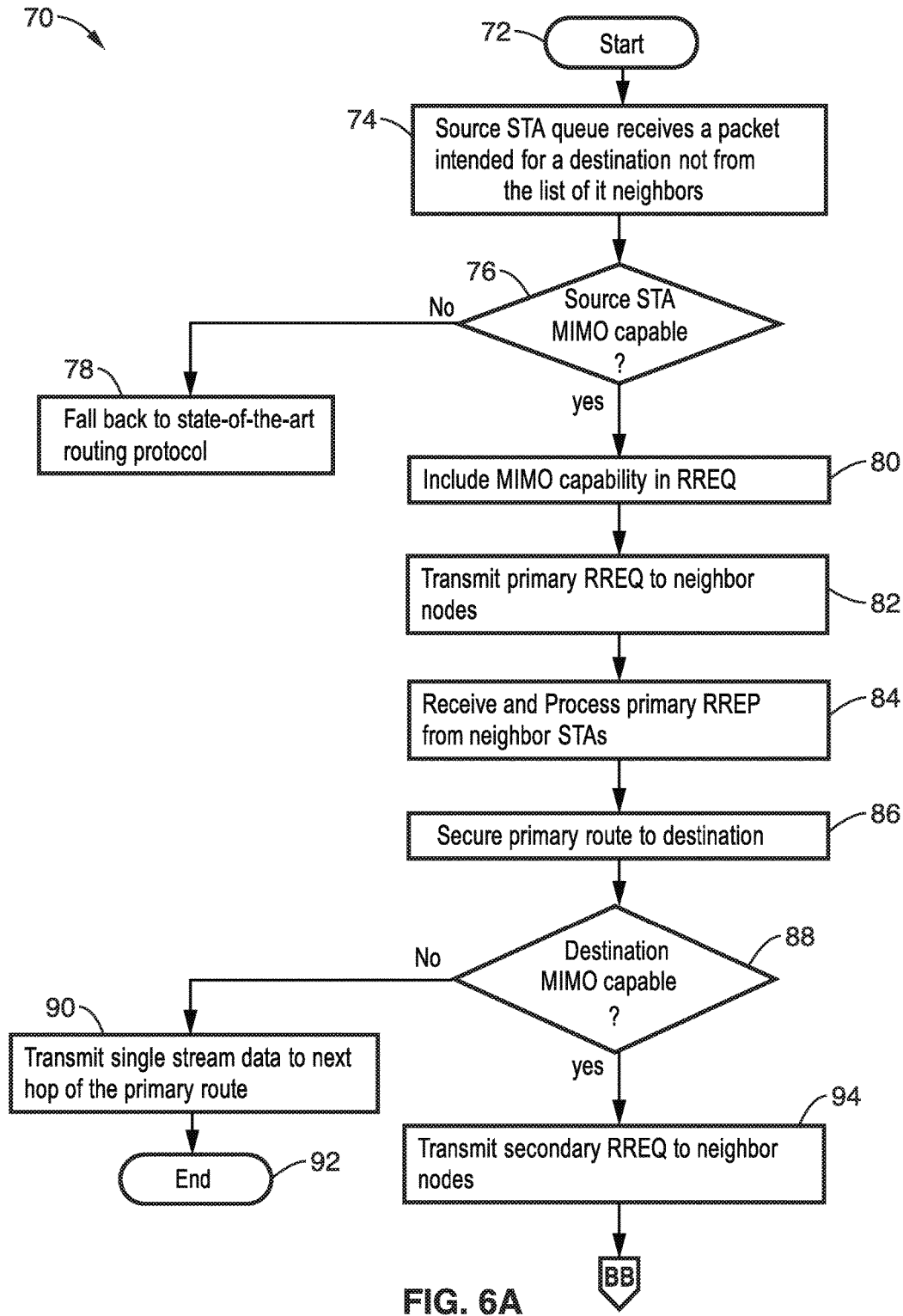
FIG. 6A and FIG. 6B are a flow diagram of a communications protocol configured for securing primary and secondary wireless routes according to an embodiment of the technology of this disclosure.
Figure 6B:
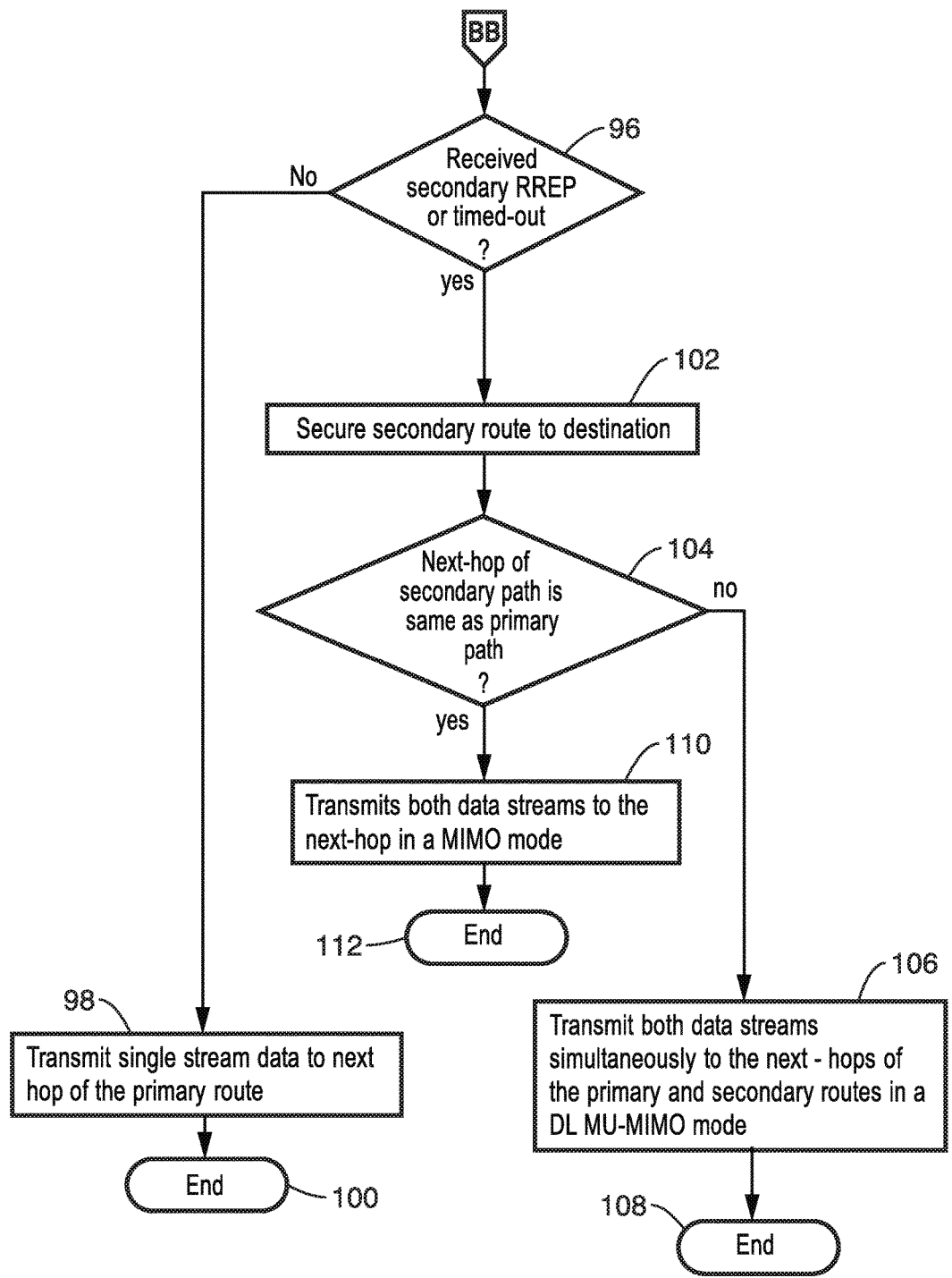

In FIG. 6A and FIG. 6B an example embodiment 70 is shown of the source STA logic (programming flow) to secure primary and secondary routes. Processing commences 72, then source STA queue receives 74 a packet intended for a destination which is not in the list of its neighbors. A check is made 76 if the source STA is MIMO capable. If the source STA is not MIMO capable, then the process falls back 78 to a conventional routing protocol. Otherwise, if the source STA is MIMO capable, then MIMO capability information is included in the RREQ 80, and a primary RREQ is transmitted 82 to a neighbor (an intermediate node), and its RREP response is received and processed 84, thus the source STA secures 86 primary route to destination. A check is made if the destination is MIMO capable 88, and if not then a single data stream is transmitted 90 to the next hop in the primary route, after which the protocol ends 92. Otherwise, if check 88 indicates that destination is MIMO capable, then a secondary RREQ is transmitted 94 to neighbor nodes. A check is made 96 (FIG. 6B) for receipt of an RREP. If this response is not received, then execution moves to block 98 with only a single stream being transmitted from the source STA to the next hop, and a completion 100 of the action. Otherwise, if the RREP is properly received at block 96, then a secondary route is secured 102 to the destination. A check is made 104 if the next hop of this secondary path is the same as the primary path. If these are the same paths, then the source STA transmits 110 both data streams to the next hop in a MIMO mode, to complete the communication 112. Otherwise, if the next hop is not the same as the primary path as found in block 104, then the source STA transmits both data streams 106 simultaneously to the next hops of the primary and secondary routes in a DL MU-MIMO mode to complete 108 the communication.

It should be noted that for the RREQ with primary route flag, the RREQ is treated as the state-of-the-art AODV. The only exception is that when the intermediate STA receiving the Extended RREQ is MIMO capable, it weighs the link cost favorably as discussed before.

Figure 7A:
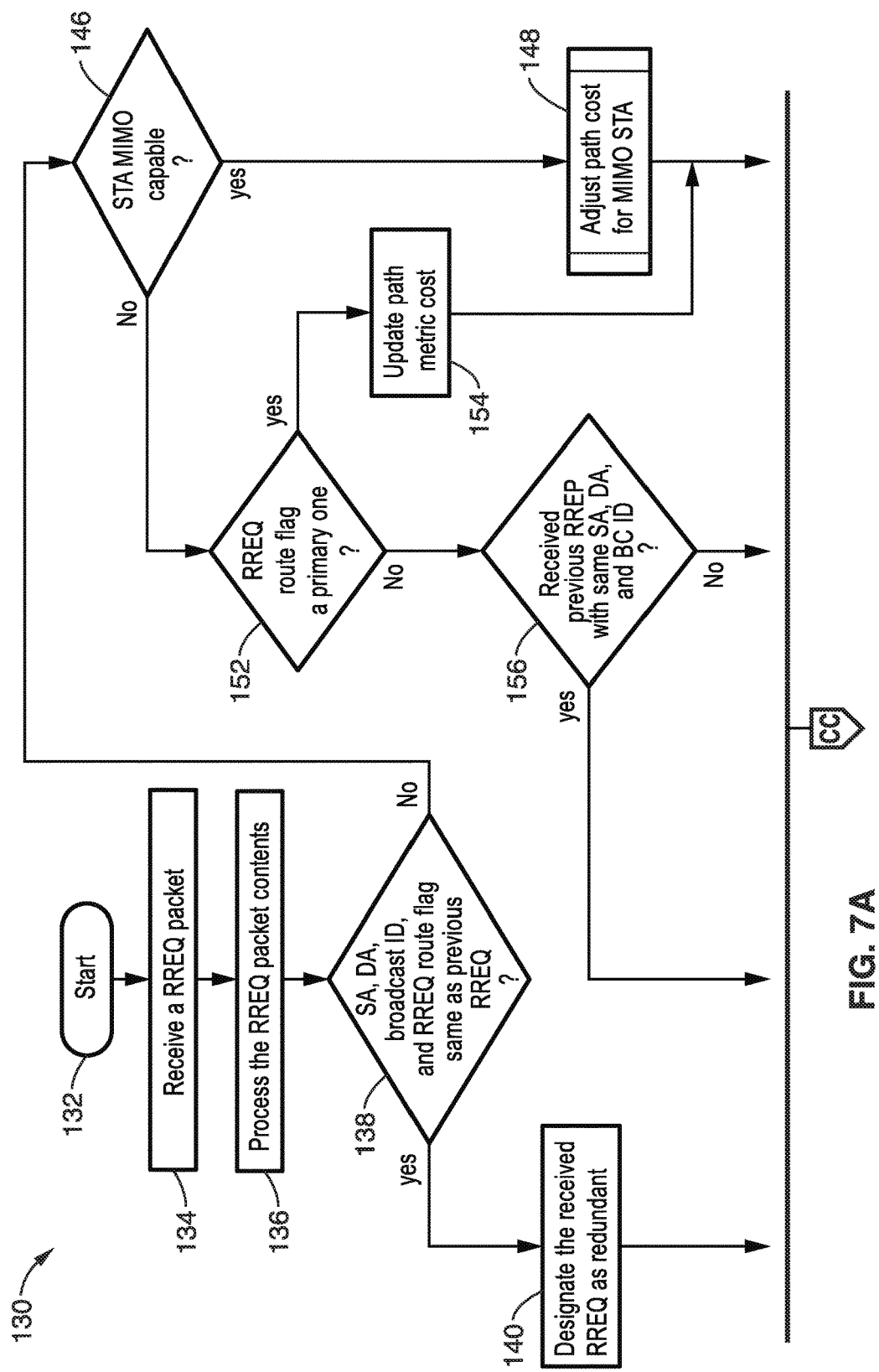
FIG. 7A and FIG. 7B are a flow diagram of a communications protocol configured for processing extended routing requests (RREQ) at intermediate nodes (STAs) according to an embodiment of the technology of this disclosure.
Figure 7B:
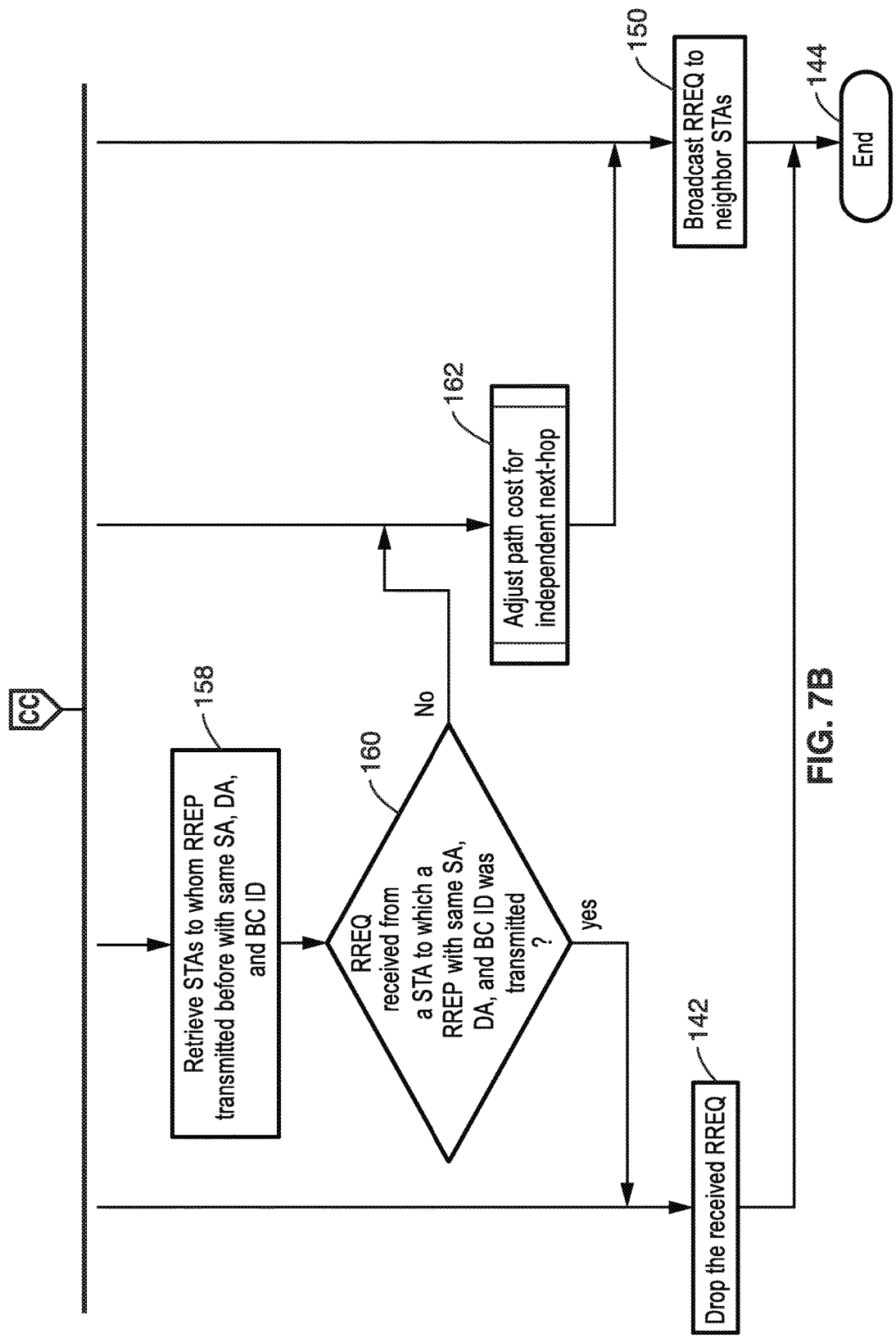

In FIG. 7A and FIG. 7B an example embodiment 130 is shown of logic (programming flow) for processing an RREQ at an intermediate node. It should be appreciated that the programming is configured to operate in different modes (source, intermediate, destination), depending on what role it is playing in the current communication context. Processing commences 132, with an RREQ packet being received 134, and its contents processed 136. A determination is made 138 if the SA, DA, ID and RREQ route flags are the same as previous RREQ. If this data is the same, then at block 140 the RREQ is treated as redundant and is dropped 142 (FIG. 7B) with the processing ending 144. Otherwise, if the data is distinct, then execution moves to block 146, where a check on MIMO capability is made. If MIMO capability is available, then execution moves to block 148 with the path cost for the MIMO STA being adjusted, followed by broadcasting 150 (FIG. 7B) the RREQ to neighbor STAs, to complete the process 144. The process of block 148 is shown in greater detail in FIG. 11. If MIMO is available, then block 152 is executed to check if RREQ route flag is set to primary. If it is set to primary, then the path cost metric is updated 154, with execution moving to block 150 to broadcast the RREQ to neighbor STAs and complete 144 processing. Otherwise, if block 152 determines that the RREQ route is not set to primary, then block 156 is executed to determine if a previous RREP was received with the same SA, DA and BC ID. If a matching RREP was not previously received, then block 162 (FIG. 7B) is executed which adjusts path cost for an independent next hop, followed by block 150 in broadcasting the RREQ to neighbors STAs 150 and completing 144 processing. The process of block 162 is shown in greater detail in FIG. 12. Otherwise, if a matching RREP was not found at block 156, then execution moves to block 158 (FIG. 7B) which retrieves information on STAs to whom the RREP was transmitted before with same SA, DA, and BC ID. A check is then made if an RREQ was received from an STA to which an RREP having same SA, DA and BC ID was transmitted. If no corresponding RREQ was found, then execution moves to block 162 to adjust path cost for an independent next hop followed by block 150 broadcasting of the RREQ to neighbor STAs to complete 144 processing. Otherwise, if block 160 determines that the RREQ matches the RREP, then execution moves to block 142 with the request being dropped and processing completing 144.

In view of the above, it is noted that some of the processing is applied for the extended RREQ with secondary route flag, having same source STA address (SA), destination STA address (DA), and broadcast ID. It will be noted in the above, that the intermediate STA applies the following rules. (a) If STA is MIMO capable then it weighs the link cost favorably and forwards the extended RREQ. (b) If STA is SISO capable it checks if it has been on the primary route or not. This can be done by checking if it received an extended RREP, with same source STA address (SA), destination STA address (DA), and broadcast ID, but with a primary route flag. (c) If the STA is along the primary route, then the extended RREQ is dropped; otherwise link cost is weighed favorably for path independence and broadcast the extended RREQ.

Figure 8:
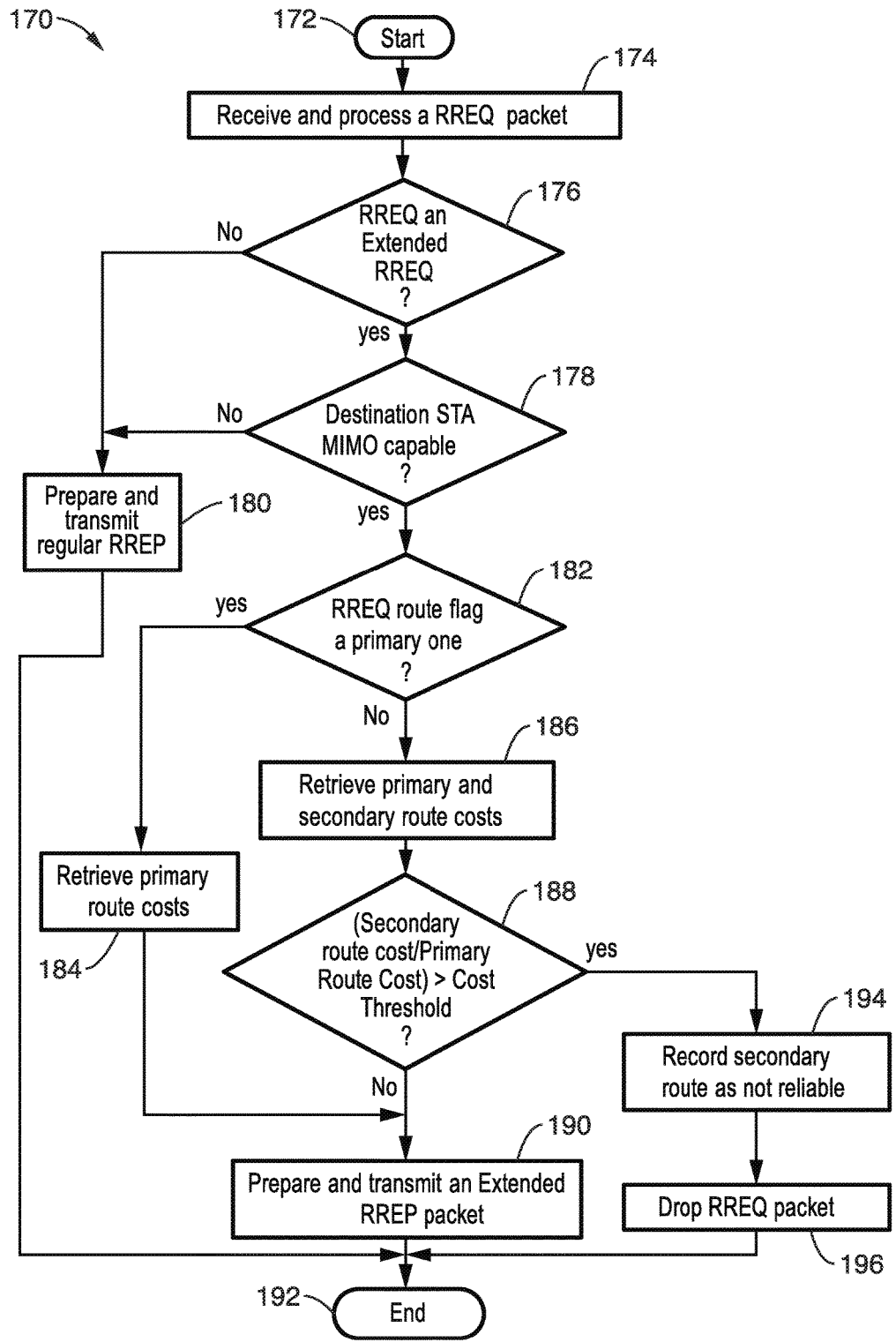
FIG. 8 is a flow diagram of a communications protocol configured for processing extended routing requests (RREQ) at destination nodes (STAs) according to an embodiment of the technology of this disclosure.

In FIG. 8 illustrates an example embodiment 170 of logic (programming flow) for processing an RREQ at a destination node. In this flow diagram, the destination STA upon receiving an extended RREQ with secondary route flag, applies the cost comparison between primary route and secondary route costs. Performing the previous steps sets up the reverse path from the destination to the source.

Processing commences 172 as an RREQ packet is received and processed 174. A check is made 176 if the RREQ is an extended RREQ. If this is not an extended RREQ, then block 180 is executed to prepare and transmit a regular RREP, and processing ends 192. Otherwise, the extended RREQ is processed at block 178, where a check is made to determine if the STA is MIMO capable. If the STA is not MIMO capable, then execution moves to block 180 with a regular RREP and ends 192. Otherwise, if the STA is MIMO capable, then the RREQ route flag is checked 182 to determine if it is a primary one. If it is primary, then execution moves to block 184 with primary route costs being retrieved, then moves to preparing the transmitting an extended RREP packet 190 and ends 192. Otherwise, if block 182 determines that the primary flag is not set, then block 186 is executed to retrieve primary and secondary routing costs, followed by decision block 188 determining if the ratio of the secondary to primary routing cost exceeds a cost threshold. If the threshold is not exceeded, then block 190 is executed to prepare and transmit the extended RREP packet and ends 192. If in block 188, the threshold is found to be exceeded, then block 194 is performed to record the secondary route and not reliable and to drop the RREQ packet 196, then end 192.

Figure 9:
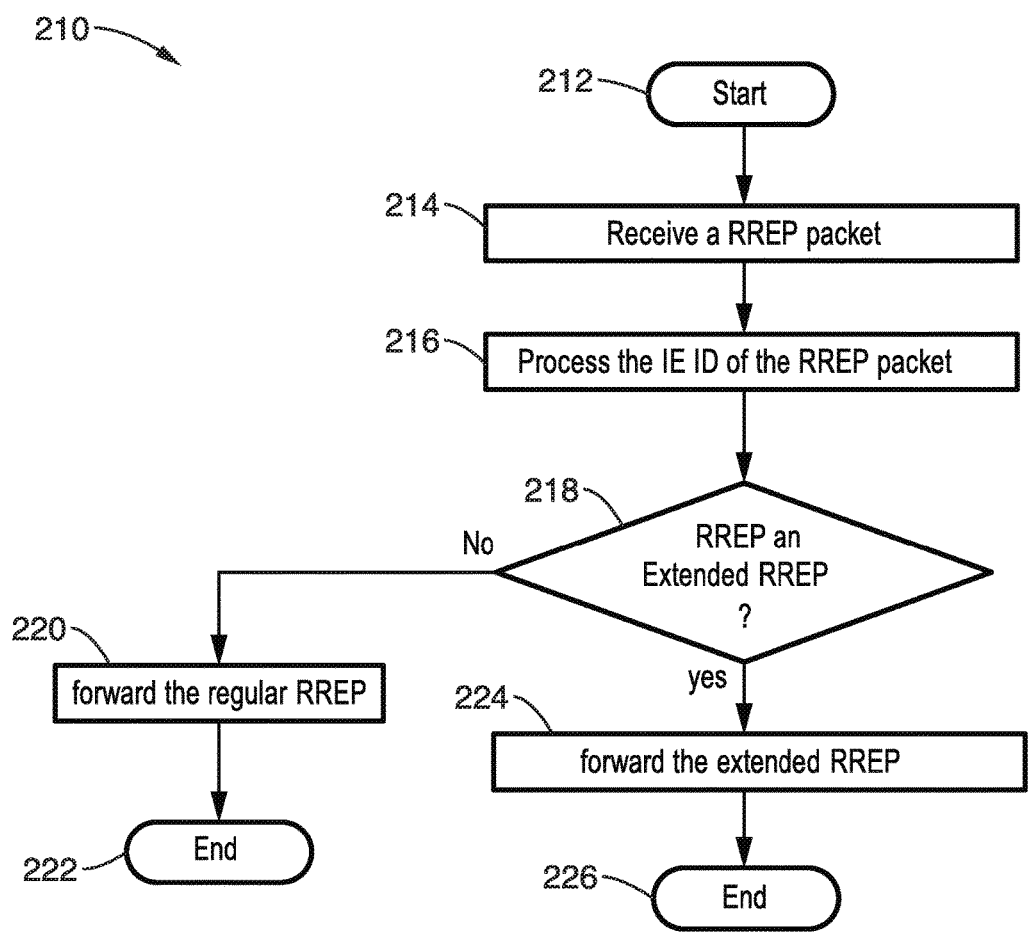
FIG. 9 is a flow diagram of a communications protocol configured for processing extended routing replies (RREP) at intermediate nodes (STAs) according to an embodiment of the technology of this disclosure.

In FIG. 9 is illustrated an example embodiment 210 of logic for processing an RREP at intermediate nodes. Execution commences 212 with an RREP packet being received 214, and its IE ID field being processed 216. At block 218 a check is made if the RREP is an extended RREP. If it is not extended, then block 220 is performed with a regular RREP being forwarded and execution ends 222. Otherwise, if it is an extended RREP, then execution moves from block 218 to block 224 at which the extended RREP is sent and execution ends 226. Thus, in the above is seen that to set up a forward path, the extended RREP is propagated from the destination to the source via intermediate STA on the primary and secondary routes.

Figure 10:
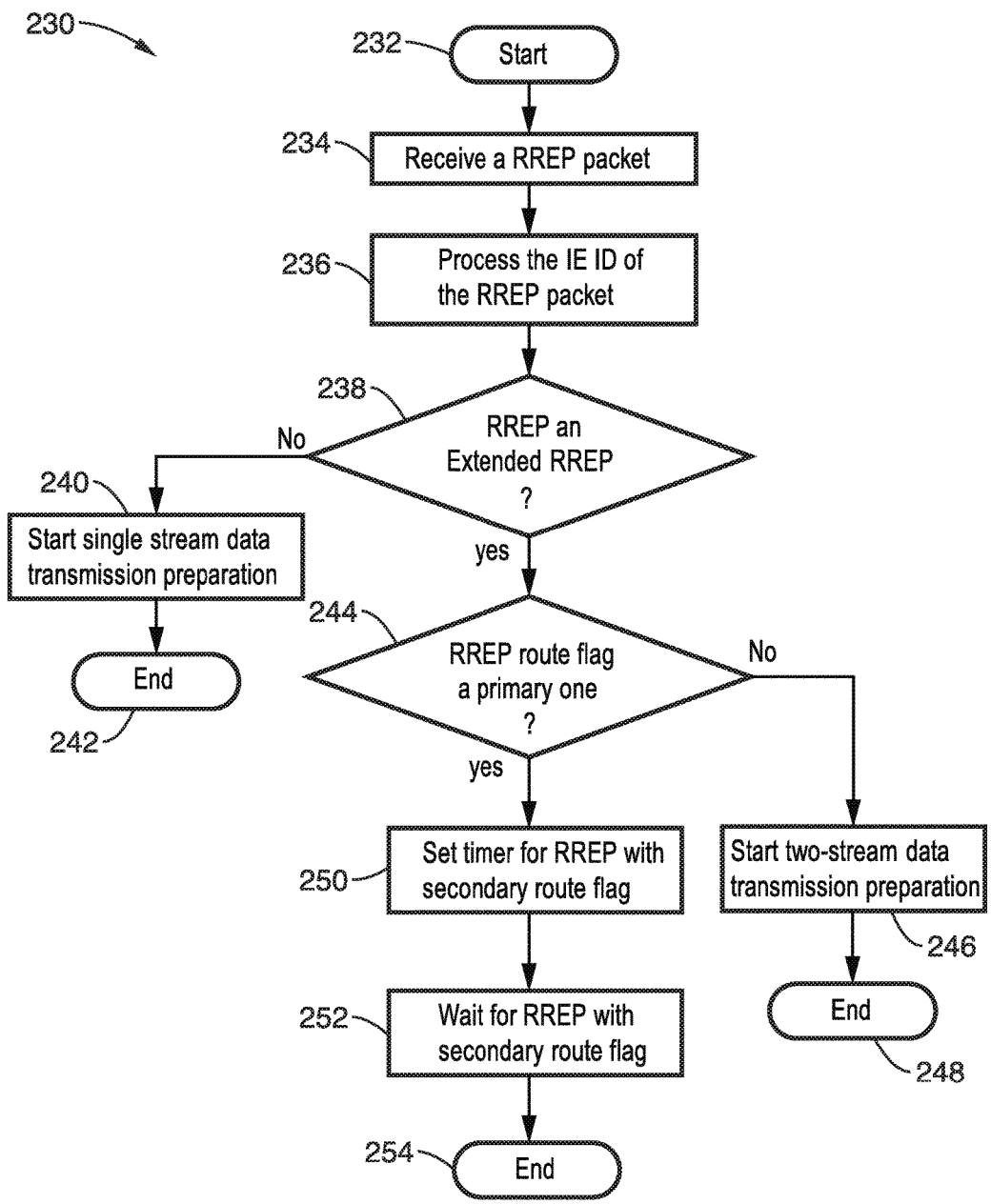
FIG. 10 is a flow diagram of a communications protocol configured for processing extended routing replies (RREP) received at a source node (STA) according to an embodiment of the technology of this disclosure.

In FIG. 10 is illustrated an example embodiment 230 of logic for processing an RREP at the source STA. Execution commences 232 with the received RREP packet, processing 234 of its IE ID field, then a check 238 for an extended RREP. If this is not an extended RREP, then block 240 is executed with the source preparing for a single stream data transmission and ending 242. Otherwise, for an extended RREP, then block 244 is executed to check for the route flag being set to primary. If the route flag is not set to primary, then block 246 is executed for the source STA to start preparations for two-stream data transmission, and end 248. Else, if the RREP is a primary one, then execution moves from block 244 to block 250 where a timer is set for RREP with a secondary route flag, and a wait 252 for this RREP with the secondary route flag before ending 254. Thus, in the above it is seen that the source STA upon receiving a primary extended RREP, sets a timer waiting for a secondary extended RREP. If the timer expires and it does not receive the secondary extended RREP, it transmits data on the primary route only. If it does, it can transmit data simultaneously on both routes.

5.3 Path Metric Adjustments 5.3.1 Path Adjustment for MIMO Capability

Figure 11:
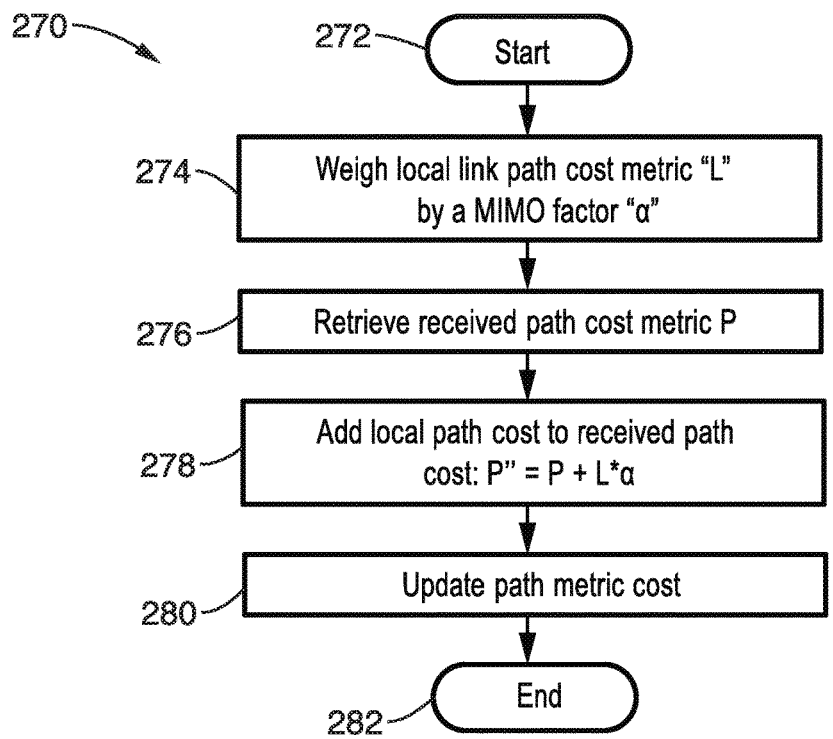
FIG. 11 is a flow diagram of adjusting path cost metric for a MIMO station (STA) according to an embodiment of the technology of this disclosure.

FIG. 11 illustrates an example embodiment 270 of logic for the disclosed advanced signal processing capability, such as MIMO architecture, that is configured to adjust the path cost in a favorable way before forwarding the RREQ. Execution starts 272 and the path cost metric L is weighted 274 by a MIMO factor $\alpha$. In this flow diagram the value L is considered to be the local link cost between a MIMO STA and the previous-hop STA (which can be either SISO or MIMO), with P being the accumulated forward path cost as reported in the received RREQ. In block 276 the received path cost metric P is received, followed by block 278 in which the local path cost is updated. The path cost metric is updated by the MIMO STA as P"=P+L*α, in which 0<α<1 is a MIMO path adjustment factor. For example, for α=¼, and assuming P=30, L=10, the result is have P"=30+(10/2)=35 according to this protocol example. In contrast to the above, in a state-of-the-art routing protocol P" would be equal to 30+10=40.

It should be appreciated that the value assigned to α is a design choice. However, for a MIMO node with two streams, α=0.5 is a reasonable default choice. Also, α can be picked to have either same value or a bit different value when a primary or a secondary route flag is processed. By way of example and not limitation, α was chosen to be the same for primary and secondary routes. Another implementation may apply α=0.9 for the primary route apply α=0.1 for the secondary route so that the STA encourages the secondary route to use this link.

A general equation for path adjustment at each node, whether SISO or MIMO, in a routing path would be $$Q = \sum_{s \in S} L(s) + \alpha \sum_{m \in M} L(m)$$

where Q is the forward path total cost, S is the set of SISO nodes on the path, M is the set of MIMO nodes, L is a single link cost, and α is the MIMO path adjustment factor.

5.3.2 Path Adjustment for an Independent Route

As explained before, the core of the current embodiment is to enable simultaneous primary and secondary path discoveries. In order to secure a secondary path which is independent from the primary path, a localized action is taken by the intermediate STAs who recognize that they were not part of the primary path. The STAs will adjust the path cost in a favorable way before forwarding the RREQ similar to the MIMO path adjustment. This favorable way is explained in the following paragraphs utilizing the independent route adjustment factor β, which reduces the link cost from L to L*β, where β<1. The favorable weighing of the link cost thus provides for picking-up that path compared to a path with the same link cost for a STA on the primary path, thus emphasizing these paths which are off the primary path.

Figure 12:
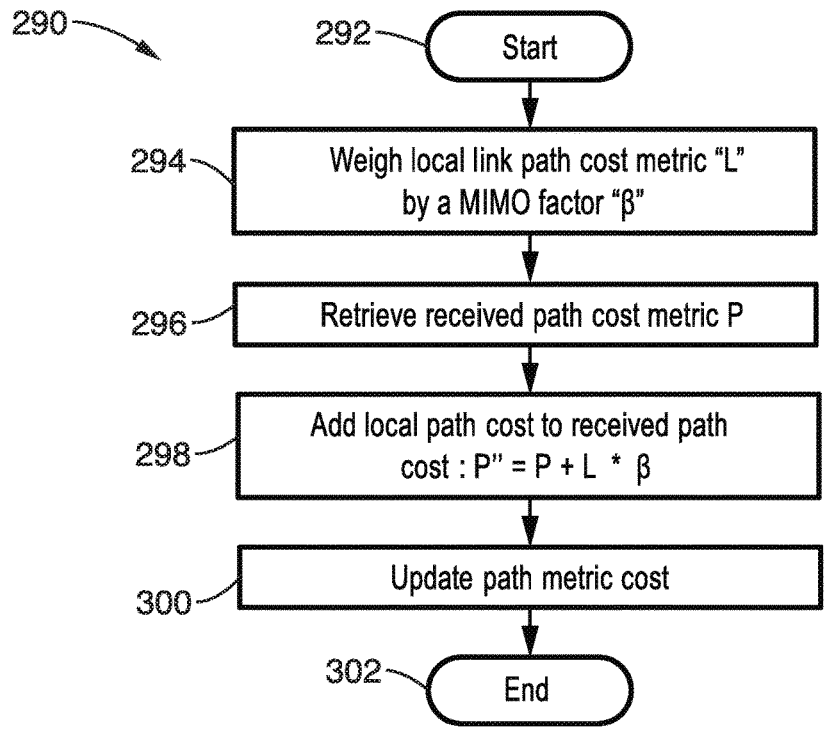
FIG. 12 is a flow diagram of adjusting path cost metric for an independent next hop station (STA) according to an embodiment of the technology of this disclosure.

FIG. 12 illustrates an example embodiment 290 for the above logic for updating path cost metric for an independent hop. Execution starts 292 and a local cost metric is weighted 294 by a MIMO factor. The independent route adjustment factor is termed β, and meets the condition β<1. Then in block 296 the path cost metric to this point is received as value P. Then in block 298 path cost metric is determined and then updated 300 by the intermediate STA, if independence condition is met, after which processing ends. In block 298 path cost metric is updated as:

$$P''=P+L*\beta.$$

5.3.3 Comparison of Costs of Primary and Secondary Routes

When the destination STA receives an extended RREQ routing flag set to primary, it will pick the path that has the lowest cost and designate it as the primary path. And again when it receives an extended RREQ with secondary route flag, it will pick the path that has the lowest cost and designate it as the secondary path. However, in certain scenarios the path cost of a candidate secondary route could be much worse than the cost of the primary route. If this is the case, then it would be considered that data transmission along that candidate secondary route would not be reliable thus triggering packet losses. Toward detecting this case, at least one embodiment of the disclosure provides a method for comparing the path cost of the primary route and a candidate secondary route as was shown in FIG. 8. The determination of this at the destination STA can be expressed by the following pseudo-code:

```
if (Extended RREQ && secondary route flag) {
    if ( R / Q > γ ){
        drop RREQ;
        No secondary route is picked;
    } else {
        prepare Extended RREP;
        transmit Extended RREP with secondary route flag set
    }
}
``` where R is the cost of the candidate secondary route, Q is the primary route cost previously recorded by the destination STA, and γ is the route threshold factor, which satisfies γ>1. For example γ=1.5, means that if the candidate secondary route cost is 150% higher than the primary route cost, the secondary route will thus not be utilized and data will be routed through the primary route.

5.4 Data Transmission.

Data transmission can start as soon as the source STA processes the received extended RREP packet. For the protocol described herein the following are the different data transmission scenarios that can arise. (a) Source STA does not receive either a primary or a secondary extended RREP. No data transmission is scheduled and a new path discovery procedure is established. (b) Source STA receives the primary extended RREP, but not the secondary extended RREP. Data is transmitted on the primary route solely. (c) The source STA receives both the primary and the secondary extended RREP. Data is transmitted simultaneously on the primary and secondary routes.

The transmission of data simultaneously on primary and secondary routes is performed through layer 1 to layer 3 coordination between the different layers of the protocol stack, specifically L1 to L3. For example, if the next hop STA, a MIMO one, is the same for both routes, spatial multiplexing MIMO technique is applied. On the other hand if the next-hop STAs for the primary and secondary routes are different, then MU-MIMO technique may be utilized for data transmission.

Figure 13A:
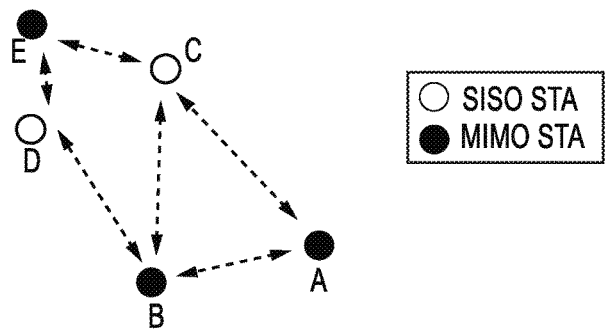
FIG. 13A through FIG. 13C are routing path diagrams depicting consequences of applying a routing protocol according to an embodiment of the technology of this disclosure.
Figure 13B:
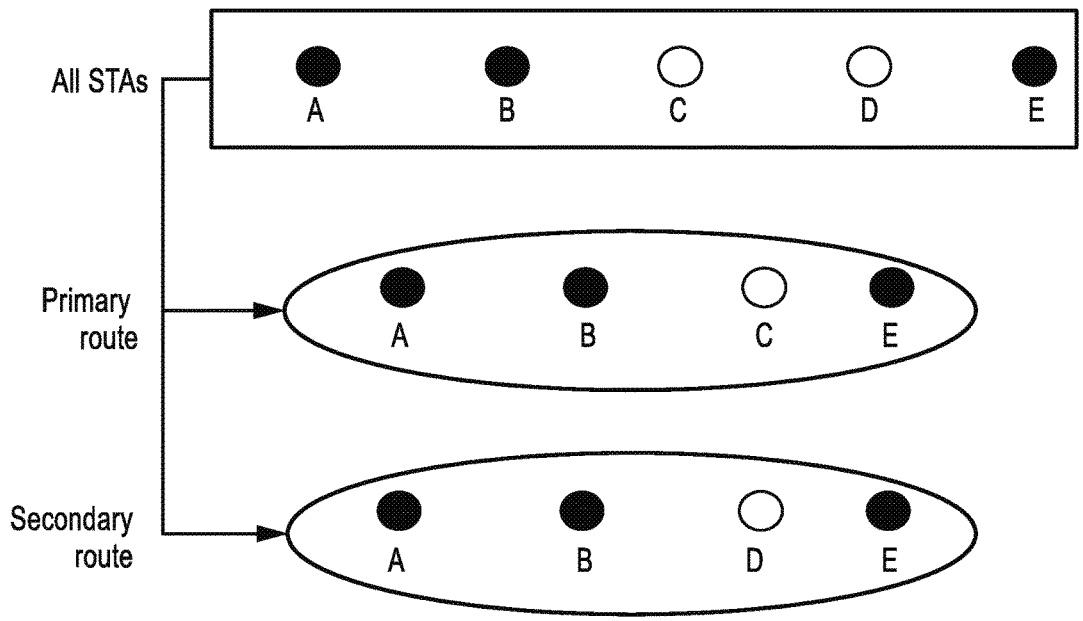
Figure 13C:
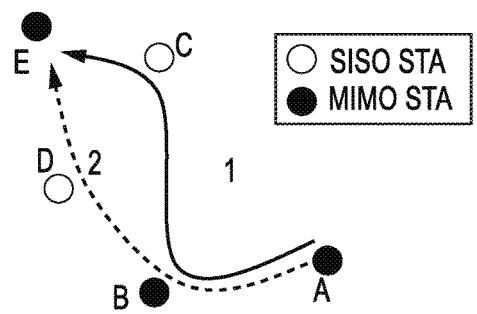

FIG. 13A through FIG. 13C illustrates consequences of applying the devised routing protocol on a mesh network. In this example some STAs may engage in the data transmissions of both primary and secondary routes. Route selection is based on the aggregate path metrics embedded in the RREP and on the MIMO capability of network STAs. In FIG. 13A a mesh network is shown with mixed MIMO capable shown as solid circles A, B and E and SISO only capable STAs shown as hashed circles C, D.

In FIG. 13B a mapping is shown per route selection rules, in which MIMO capable STAs can exist in two (or more) routes simultaneously. The top row of this depicts ALL STAs, with a primary route shown below that as A, B, C and E, while the secondary route is shown under that as A, B, D and E.

In FIG. 13C routes are illustrated from A to E that can carry two independent data streams from the source STA to the destination STA. The primary route is depicted as a solid line, while the secondary route is shown dashed. It will be noted that MIMO capable STA B receives and transmits two data streams simultaneously.

Figure 14A:
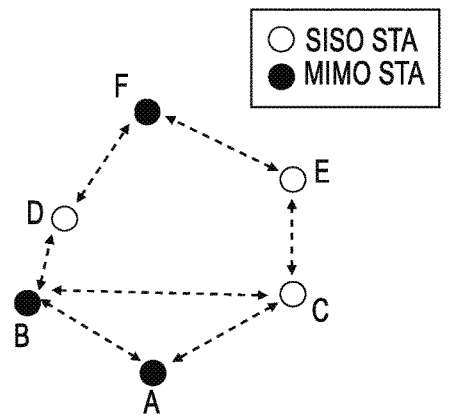
FIG. 14A through FIG. 14E are routing path diagrams exemplifying applying the routing protocol according to an embodiment of the technology of this disclosure.
Figure 14B:
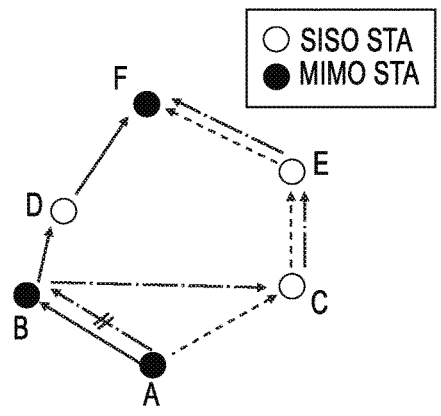
Figure 14C:
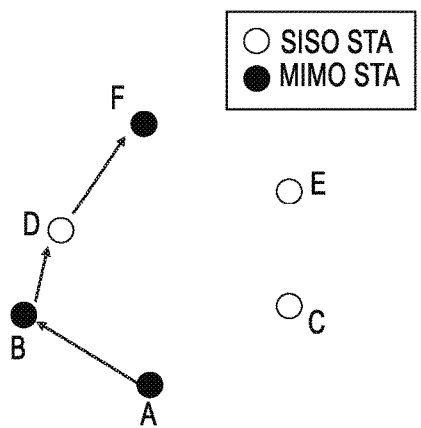
Figure 14D:
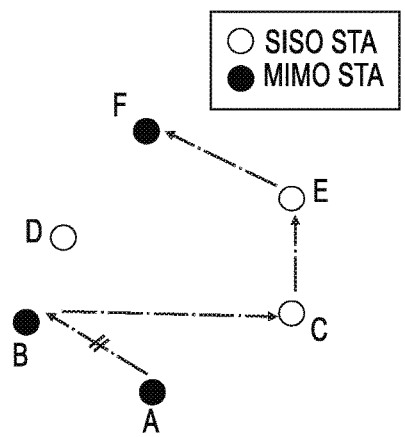
Figure 14E:
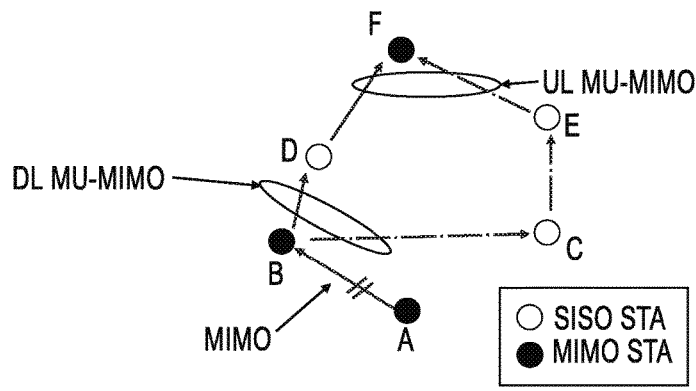

FIG. 14A through FIG. 14E illustrates applying the routing protocol on a mesh network. The network contains STAs that are either SISO or MIMO capable. It should be appreciated that the technology of this disclosure would also be applicable to variants of SISO, MIMO and combinations thereof without departing from the present disclosure. Upon applying the proposed routing protocol, data transmission can occur in two routes simultaneously. It should be appreciated that in this example, three MIMO techniques are utilized, spatial multiplexing, downlink (DL) MU-MIMO, and uplink (UL) MU-MIMO. The following provides examples of routing multiple data streams simultaneously. FIG. 14A illustrates bidirectional links between STAs (STAs A, B, C, D, E, and F) in the network. In FIG. 14B some possible independent routes from source to destination are shown. It will be noted that the link from STA A to STA B can utilize MIMO transmission (the double dashes). In FIG. 14C a primary route is shown selected per state-of-the-art routing protocols. In FIG. 14D a secondary route is shown being selected per the rules explained in the current embodiments of the technology of this disclosure. In FIG. 14E simultaneous data transmission through primary and secondary routes are shown according to an embodiment of the technology of this disclosure. It will be seen that one path A-B utilizes MIMO, while dual paths from STAs B to D and B to C use downlink (DL) multi-user (MU) MIMO, while dual receive paths, from STAs E to F and from D to F, are seen as uplink (UL) multi-user (MU) MIMO. The use of these advanced techniques and routing independent data streams through two paths simultaneously improves the network throughput substantially.

It should be appreciated that the technology of this disclosure may be utilized on systems which do not necessarily utilize MU-MIMO; for example, when both the next hop STA is also MIMO capable and the primary and secondary paths overlap.

Figure 15A:
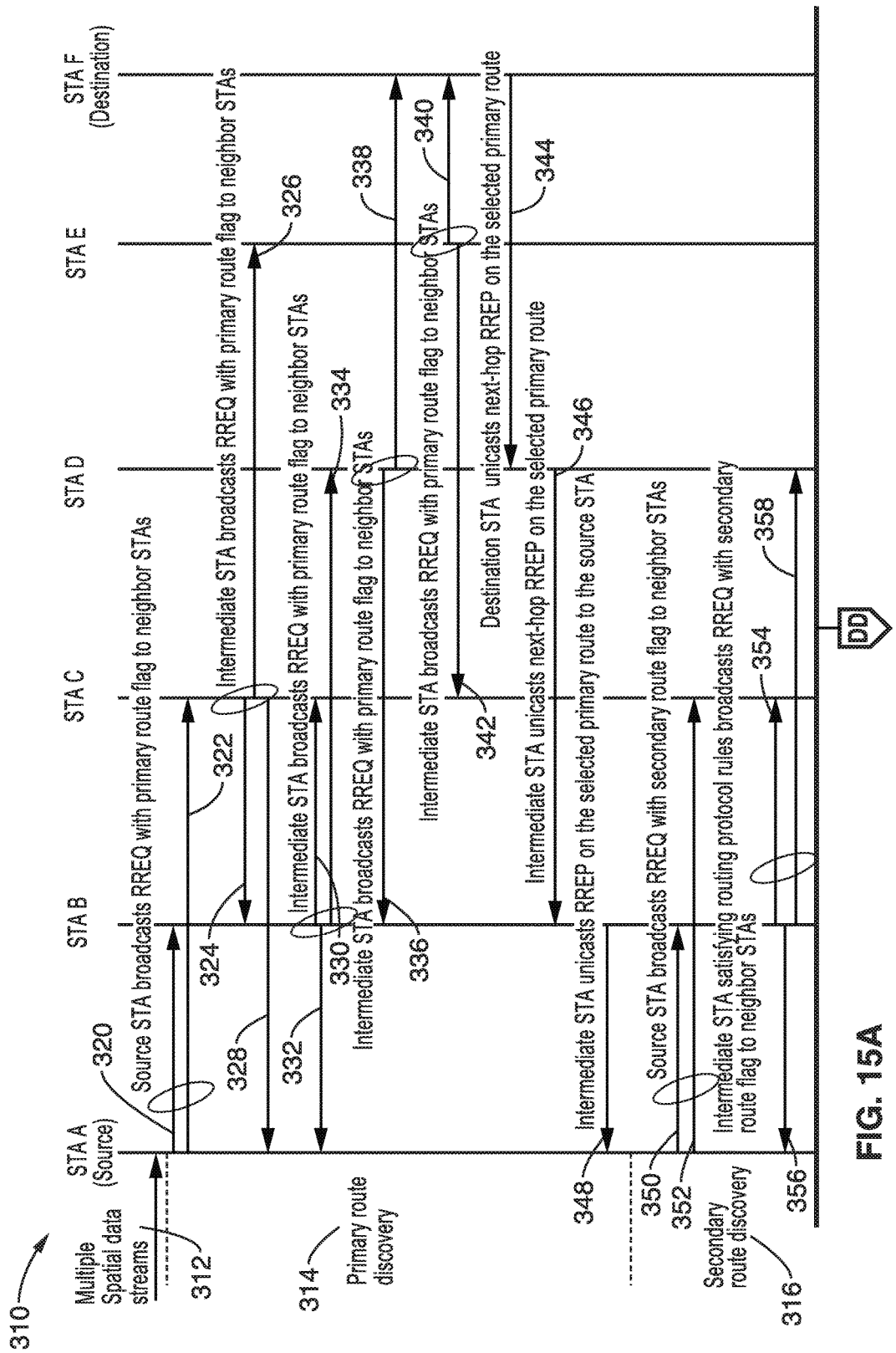
FIG. 15A and FIG. 15B are a messaging flow-timeline depicting securing of a primary and secondary route according to an embodiment of the technology of this disclosure.
Figure 15B:
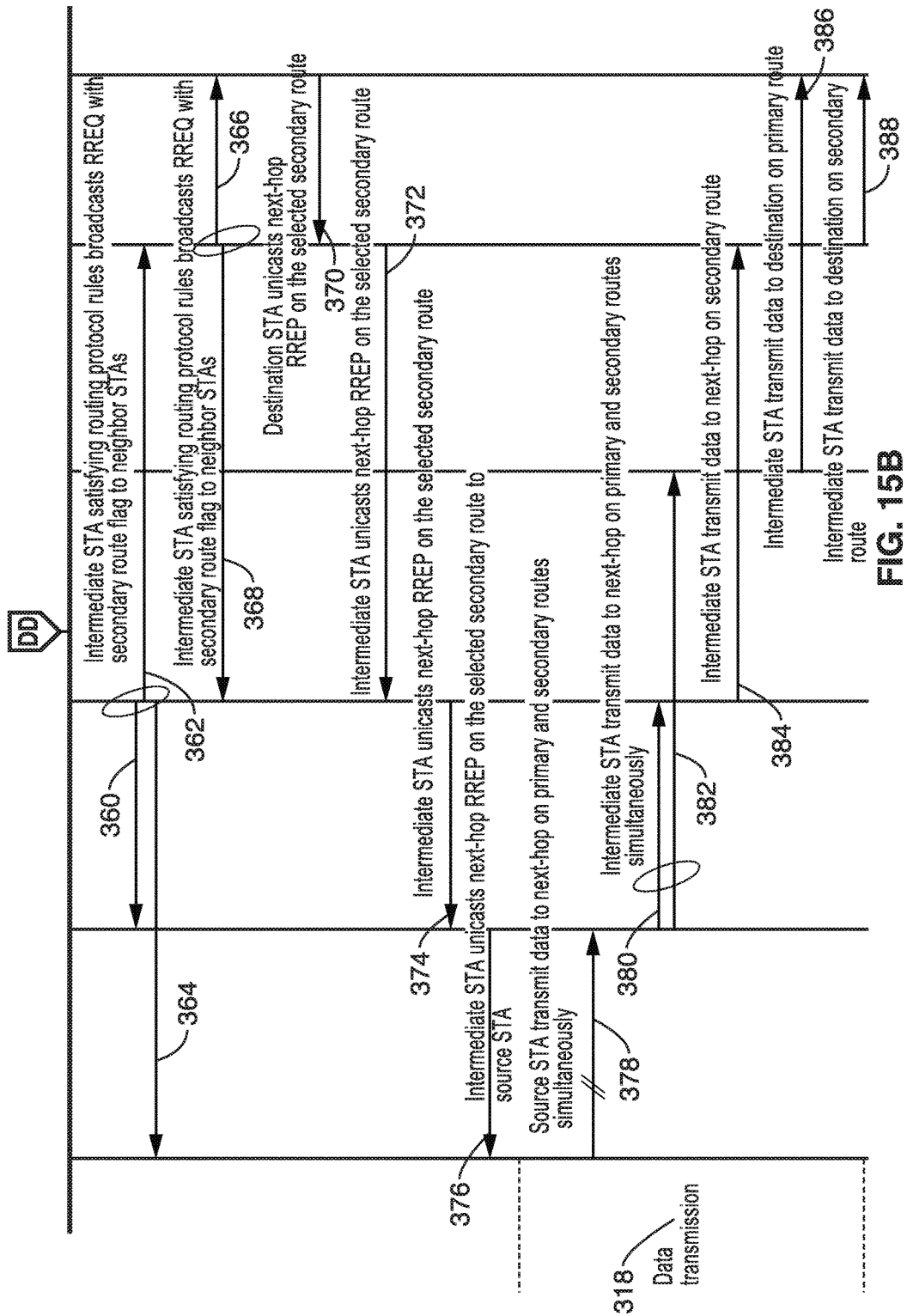

FIG. 15A and FIG. 15B show the messaging needed to accomplish the three phases of data communications in the mesh network topology as was depicted in FIG. 14A through FIG. 14E, including primary path discovery, secondary path discovery, and finally data transmission. The STAs shown in FIG. 14A through FIG. 14E are seen listed across the top of the figure as (STA A through STA F), while the basic operation is seen listed up the left side of the figure, showing multiple spatial data streams 312, primary route discover 314, secondary route discovery 316, and data transmission 318. Upon receiving the multiple spatial data streams STA A sends an RREQ to its neighbor STAs shown as an RREQ 320 to STA B, and RREQ 322 to STA C. Upon receiving the RREQ, STA C is shown sending intermediate RREQ broadcasts with primary flag set to its neighbors, in particular an RREQ 324 to STA B, and an RREQ 326 to STA E, and an RREQ 328 back to STA A. Similarly, STA B sends intermediate RREQ broadcasts with primary flag set to its neighbors, in particular an RREQ 330 to STA C, and an RREQ 334 to STA D, as well as an RREQ 332 back to STA A. Intermediate node STA D sends RREQ to its neighbors STA B 336, and STA F 338. Intermediate node STA E sends RREQ to its neighbors STA C 342, and STA F 340. The destination node STA F replies back to the RREQ with an RREP along this selected primary route 344 from STA F to STA D, then STA D sends 346 the RREP to STA B, and STA B sends 348 the RREP back to STA A which logs this as the primary route.

Now the secondary route discovery commences. With secondary routing flag set STA A sends RREQs 350, 352 to STAs B and C.

Intermediate STA B sends RREQs 354, 356, 358. Similarly, intermediate STA C sends RREQs 360, 362 and 364 (FIG. 15B). Similarly, intermediate STA E sends RREQs 366 and 368. Then destination STA F unicasts a next hop RREP on the selected secondary route 370 to STA E. STA E sends the RREP 372 to STA C, which sends RREP 374 to STA B, which sends RREP 376 to STA A, which logs the secondary path for use.

The data transmission phase begins with STA transmitting 378 along both the primary and secondary routes. The intermediate STA B sends data along primary route 382 to STA D, and along secondary route 380 to STA C. STA D sends data 386 to STA F to complete the primary route. STA C sends data 384 on secondary route to STA E, which sends data 388 to complete this secondary route to STA F. The diagram thus indicates steps in discovery of both the primary and secondary paths, as well as transmission along both routes.

Figure 16:
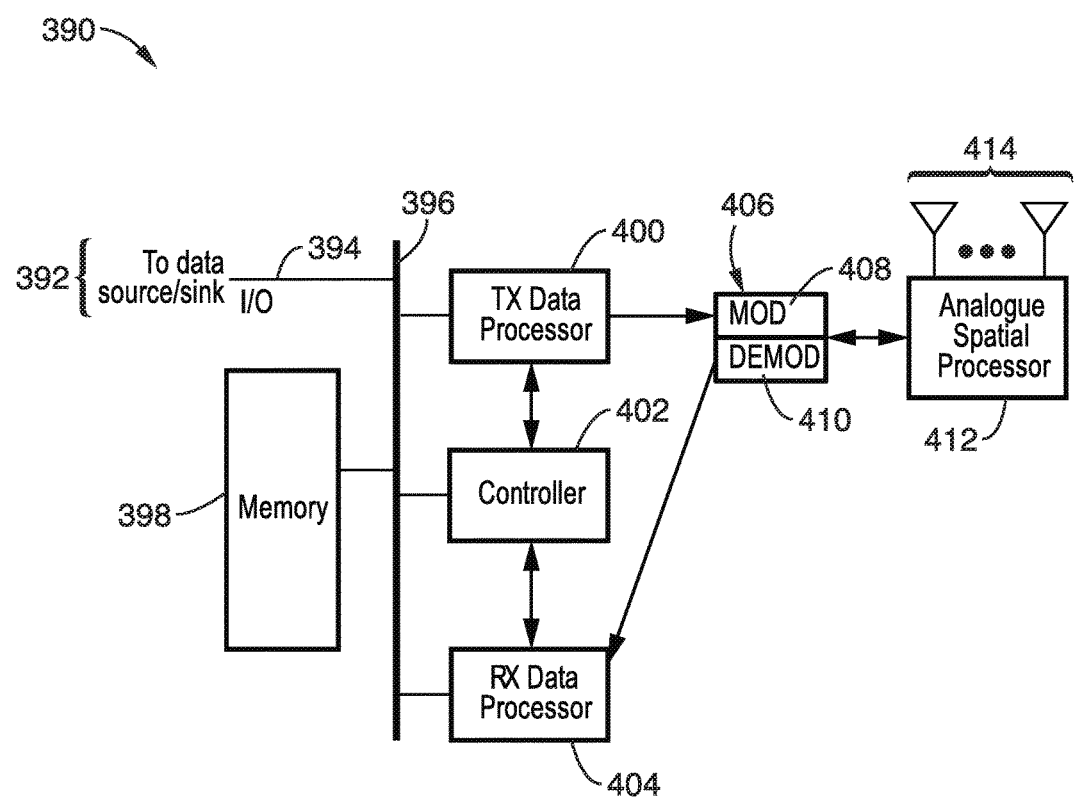
FIG. 16 is a block diagram of a single-input-single-output (SISO) station (STA) according to an embodiment of the technology of this disclosure.

FIG. 16 illustrates an example embodiment 390 of a single-input-single-output (SISO) station (STA) configured for operation according to the technology of this disclosure. A data line 392 is seen connecting from a source/sink device through connection 394 to a bus 396 to a memory 398, controller 402, TX data processor 400, and RX data processor 404. A modulator/demodulator (mod/demod) 406 is shown having modulator 408 and demodulator 410, and being coupled to the spatial processor 412 having antennas 414. TX data processor is coupled for output through a modulator 408, while RX data processor 404 is coupled for input from a demodulator 410.

It will be noted that the controller accesses the memory and provides control signals to the TX data processors to access the bits from the data sink and perform scrambling, coding, interleaving of raw data, and mapping to data symbols or to the RX processor to de-map the received data symbols and perform deinterleaving, decoding, and descrambling operations. The modulator processes and modulates the digital symbols to analog symbols. The demodulator receives the analog symbols and demodulates to digital symbols.

Figure 17:
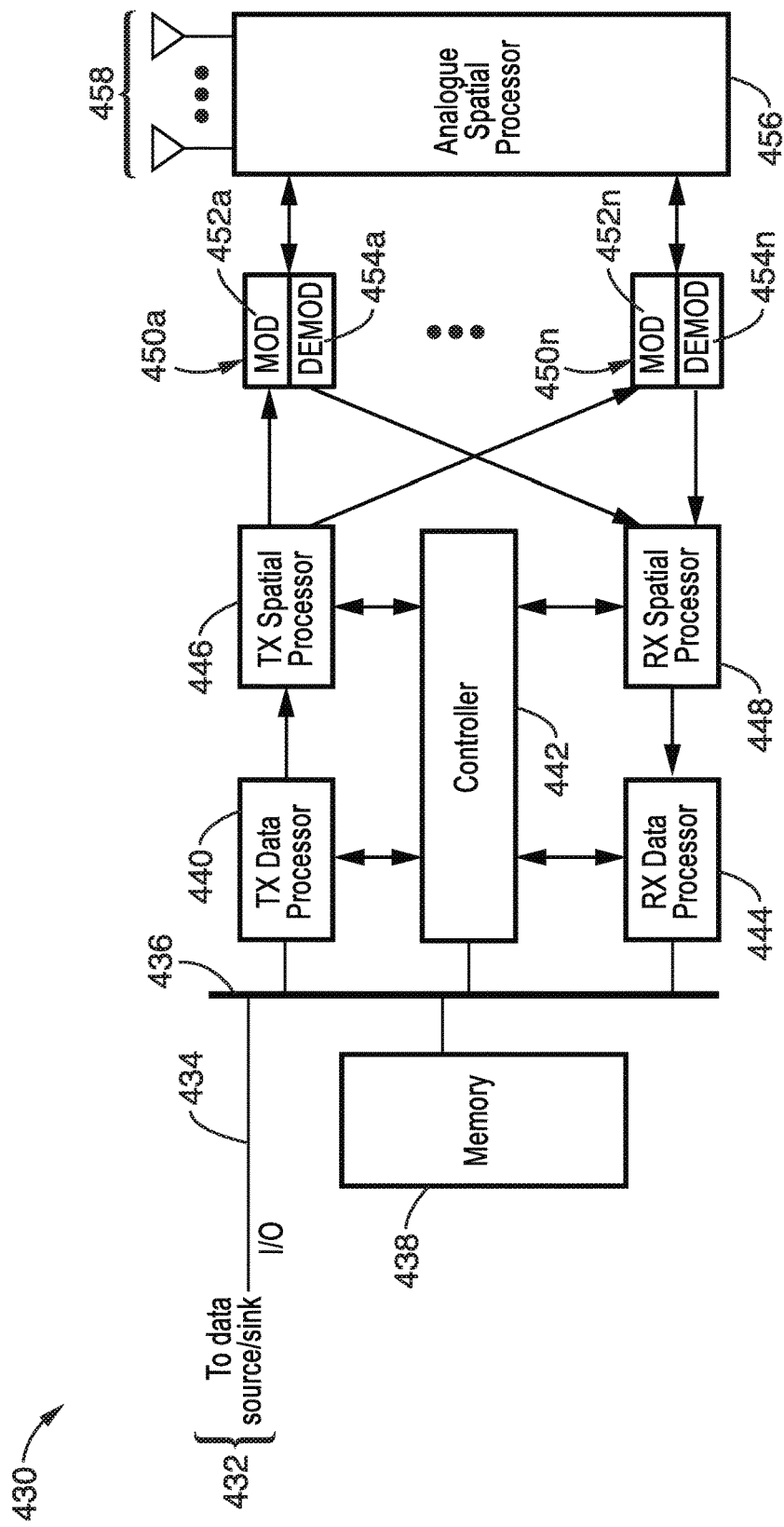
FIG. 17 is a block diagram of a single-input-single-output (MIMO) station (STA) according to an embodiment of the technology of this disclosure.

FIG. 17 illustrates an example embodiment 430 of a multiple-input-multiple-output (MIMO) station (STA) configured for operation according to the technology of this disclosure. A data line 432 is seen connecting from a source/sink device through connection 434 to a bus 436 to a memory 438, controller 442, TX data processor 440, and RX data processor 444. In view of there being multiple inputs and outputs, TX data processor 440 couples to both the controller 442 and to a TX spatial processor 446. Similarly, RX data processor couples to the controller 442, and receives data from a RX spatial processor 448. Multiple mod/demod devices 450a-450n are coupled to an analog spatial processor 456, which has a plurality of antennas 458. The individual modulators 452a-452n, of mod/demod devices 450a-450n, receive TX inputs from TX spatial processor 446. In a similar manner the individual demodulators 454a-454n, of mod/demod devices 450a-450n, receive RX inputs from analog spatial processor 456 which are passed to RX spatial processor 448.

It will be noted that the controller, modulators and demodulators perform the same basic functions as described for the previous embodiment. The TX spatial processor performs spatial precoding and spatial mapping of the spatial streams to match the transmit chains. The RX spatial processor performs spatial de-mapping of spatial streams received from the different receive chains and performs spatial decoding.

The enhancements described in the technology of this disclosure can be readily implemented within various wireless communication devices. It should also be appreciated that wireless data communication devices are typically implemented to include one or more computer processor devices (e.g., CPU, microprocessor, microcontroller, computer enabled ASIC, etc.) and associated memory storing instructions (e.g., RAM, DRAM, NVRAM, FLASH, computer readable media, etc.) whereby programming (instructions) stored in the memory are executed on the processor to perform the steps of the various process methods described herein.

It will also be appreciated that the computer readable media (memory storing instructions) in these computations systems is "non-transitory", which comprises any and all forms of computer-readable media, with the sole exception being a transitory, propagating signal. Accordingly, the disclosed technology may comprise any form of computer-readable media, including those which are random access (e.g., RAM), require periodic refreshing (e.g., DRAM), those that degrade over time (e.g., EEPROMS, disk media), or that store data for only short periods of time and/or only in the presence of power, with the only limitation being that the term "computer readable media" is not applicable to an electronic signal which is transitory.

Embodiments of the present technology may be described herein with reference to flowchart illustrations of methods and systems according to embodiments of the technology, and/or procedures, algorithms, steps, operations, formulae, or other computational depictions, which may also be implemented as computer program products. In this regard, each block or step of a flowchart, and combinations of blocks (and/or steps) in a flowchart, as well as any procedure, algorithm, step, operation, formula, or computational depiction can be implemented by various means, such as hardware, firmware, and/or software including one or more computer program instructions embodied in computer-readable program code. As will be appreciated, any such computer program instructions may be executed by one or more computer processors, including without limitation a general purpose computer or special purpose computer, or other programmable processing apparatus to produce a machine, such that the computer program instructions which execute on the computer processor(s) or other programmable processing apparatus create means for implementing the function(s) specified.

Accordingly, blocks of the flowcharts, and procedures, algorithms, steps, operations, formulae, or computational depictions described herein support combinations of means for performing the specified function(s), combinations of steps for performing the specified function(s), and computer program instructions, such as embodied in computer-readable program code logic means, for performing the specified function(s). It will also be understood that each block of the flowchart illustrations, as well as any procedures, algorithms, steps, operations, formulae, or computational depictions and combinations thereof described herein, can be implemented by special purpose hardware-based computer systems which perform the specified function(s) or step(s), or combinations of special purpose hardware and computer-readable program code.

Furthermore, these computer program instructions, such as embodied in computer-readable program code, may also be stored in one or more computer-readable memory or memory devices that can direct a computer processor or other programmable processing apparatus to function in a particular manner, such that the instructions stored in the computer-readable memory or memory devices produce an article of manufacture including instruction means which implement the function specified in the block(s) of the flowchart(s). The computer program instructions may also be executed by a computer processor or other programmable processing apparatus to cause a series of operational steps to be performed on the computer processor or other programmable processing apparatus to produce a computer-implemented process such that the instructions which execute on the computer processor or other programmable processing apparatus provide steps for implementing the functions specified in the block(s) of the flowchart(s), procedure (s) algorithm(s), step(s), operation(s), formula(e), or computational depiction(s).

It will further be appreciated that the terms "programming" or "program executable" as used herein refer to one or more instructions that can be executed by one or more computer processors to perform one or more functions as described herein. The instructions can be embodied in software, in firmware, or in a combination of software and firmware. The instructions can be stored local to the device in non-transitory media, or can be stored remotely such as on a server, or all or a portion of the instructions can be stored locally and remotely. Instructions stored remotely can be downloaded (pushed) to the device by user initiation, or automatically based on one or more factors.

It will further be appreciated that as used herein, that the terms processor, computer processor, central processing unit (CPU), and computer are used synonymously to denote a device capable of executing the instructions and communicating with input/output interfaces and/or peripheral devices, and that the terms processor, computer processor, CPU, and computer are intended to encompass single or multiple devices, single core and multicore devices, and variations thereof.

From the description herein, it will be appreciated that that the present disclosure encompasses multiple embodiments which include, but are not limited to, the following:

1. A wireless communication apparatus, comprising: (a) a wireless communication circuit configured for wirelessly communicating with other wireless communication stations; (b) a computer processor coupled to said wireless communication circuit; and (c) a non-transitory computer-readable memory storing instructions executable by the computer processor; (d) wherein said instructions, when executed by the computer processor, perform steps comprising: (d)(i) communicating with the other wireless communication stations utilizing a routing protocol; (d)(ii) performing primary and secondary path discovery in establishing communications with a destination wireless communication station, through intermediate wireless communication stations; (d)(iii) determining by intermediate stations that secondary path segments are not part of the primary path and adjusting a path cost metric to assure said secondary path is independent of said primary path; and (d)(iv) transmitting data on the primary and the secondary path simultaneously.

2. The apparatus of any preceding embodiment, wherein said instructions when executed by the computer processor are configured for causing an intermediate wireless communication station to adjusts path cost metric in response to signal processing capability of a wireless communication station on that path.

3. The apparatus of any preceding embodiment, wherein said routing protocol is an extension of an ad-hoc on-demand distance vector (AODV) routing protocol.

4. The apparatus of any preceding embodiment, wherein said instructions when executed by the computer processor are configured for performing primary and secondary path discovery in establishing communications with a destination wireless communication station in response to utilizing extended routing request (RREQ) and routing reply (RREP) information elements sent to neighboring stations.

5. The apparatus of any preceding embodiment, wherein said instructions when executed by the computer processor are configured for utilizing said extended routing request (RREQ) and routing reply (RREP) information elements which contain a distinct extended identifier which differentiates them from a conventional (non-extended) routing request (RREQ) and routing reply (RREP), and each contain a routing flag indicating a selection between a primary routing path and a secondary routing path.

6. The apparatus of any preceding embodiment, wherein said instructions when executed by the computer processor are configured for utilizing the conventional routing request (RREQ) when the wireless communication circuit is operating as a source wireless communication station which lacks multiple-input-multiple-output (MIMO) capability.

7. The apparatus of any preceding embodiment, wherein said instructions when executed by the computer processor are configured for transmitting data along only the primary routing path if it is determined that the destination wireless communication station does not have multiple-input-multiple-output (MIMO) capability.

8. The apparatus of any preceding embodiment, wherein said instructions when executed by the computer processor are configured for operating in different modes, comprising source wireless communication station, intermediate wireless communication station, and destination wireless communication station, depending on what role said apparatus is fulfilling within a current communication context.

9. The apparatus of any preceding embodiment, wherein said wireless communication circuit comprises a single-input-single-output (SISO) wireless communication circuit.

10. The apparatus of any preceding embodiment, wherein said single-input-single-output (SISO) wireless communication circuit, comprises: (a) a transmitter data processor which receives source data, processes it for transmission according to the routing protocol; (b) a modulator receiving digital output from said transmitter data processor, converting it to an analog TX signal; (c) an analog spatial processor coupled to multiple antennas, and configured for receiving said analog TX signal and coupling this to the multiple antennas for wireless transmission; (d) a demodulator receiving analog input from said analog spatial processor, converting it to a digital signal; and (e) a receiver data processor which receives digital signals from said demodulator, and generates a sink data stream for output.

11. The apparatus of any preceding embodiment, wherein said wireless communication circuit comprises a multiple-input-multiple-output (MIMO) wireless communication circuit.

12. The apparatus of any preceding embodiment, wherein said multiple-input-multiple-output (MIMO) wireless communication circuit, comprises: (a) a transmitter data processor which receives source data, processes it for transmission according to the routing protocol; (b) a transmitter spatial processor which spatially converts the output from said transmitter data processor to spatial outputs; (c) a plurality of modulators each receiving one of the spatial outputs and converting it to an analog TX signal; (d) an analog spatial processor coupled to multiple antennas, and configured for receiving said analog TX signal from each of said plurality of modulators and coupling this to the multiple antennas for wireless transmission; (e) a plurality of demodulators receiving analog input from said analog spatial processor, converting it to digital receiver signals; (f) a receiver spatial processor which receives digital receiver signals from said plurality of demodulators, and spatially processes them into a digital data output; and (g) a receiver data processor which receives digital data output from said receiver spatial processor from which it generates a sink data stream for output.

13. The apparatus of any preceding embodiment, wherein said apparatus is utilized in a communication application selected from the group of wireless communication applications consisting of: wireless local area networks (WLANs), wireless personal area networks (WPANs), wireless multiple hop relaying networks, peer-to-peer (P2P) communications, outdoor wireless communications, Wi-Fi networks, Internet of things (IoT) applications, backhauling of data by mesh networking, next generation cellular networks with D2D communications, 802.11 networks, and ZigBee.

14. A wireless communication apparatus, comprising: (a) a wireless communication circuit configured for wirelessly communicating with other wireless communication stations; (b) a computer processor coupled to said wireless communication circuit; and (c) a non-transitory computer-readable memory storing instructions executable by the computer processor; (d) wherein said instructions, when executed by the computer processor, perform steps comprising: (d)(i) communicating with the other wireless communication stations utilizing a routing protocol; (d)(ii) performing primary and secondary path discovery in establishing communications with a destination wireless communication station, through intermediate wireless communication stations; (d)(iii) wherein performing primary and secondary path discovery in establishing communications with a destination wireless communication station is in response to utilizing extended routing request (RREQ) and routing reply (RREP) information elements sent to neighboring stations, in which said extended routing request (RREQ) and routing reply (RREP) information elements contain a routing flag indicating a selection between a primary routing path and a secondary routing path; (d)(iv) determining by intermediate stations that secondary path segments are not part of the primary path and adjusting a path cost metric to assure said secondary path is independent of said primary path; and (d)(v) transmitting data on the primary and the secondary path simultaneously.

15. The apparatus of any preceding embodiment, wherein said instructions when executed by the computer processor are also configured for utilizing the conventional routing request (RREQ) when the wireless communication circuit is operating as a source wireless communication station which lacks multiple-input-multiple-output (MIMO) capability.

16. The apparatus of any preceding embodiment, wherein said instructions when executed by the computer processor are also configured for transmitting data along only the primary routing path if it is determined that the destination wireless communication station does not have multiple-input-multiple-output (MIMO) capability.

17. The apparatus of any preceding embodiment, wherein said instructions when executed by the computer processor are configured for operating in different modes, comprising source wireless communication station, intermediate wireless communication station, and destination wireless communication station, depending on what role said apparatus is fulfilling within a current communication context.

18. The apparatus of any preceding embodiment, wherein said wireless communication circuit comprises a single-input-single-output (SISO) wireless communication circuit, comprising: (a) a transmitter data processor which receives source data, processes it for transmission according to the routing protocol; (b) a modulator receiving digital output from said transmitter data processor, converting it to an analog TX signal; (c) an analog spatial processor coupled to multiple antennas, and configured for receiving said analog TX signal and coupling this to the multiple antennas for wireless transmission; (d) a demodulator receiving analog input from said analog spatial processor, converting it to a digital signal; and (e) a receiver data processor which receives digital signals from said demodulator, and generates a sink data stream for output.

19. The apparatus of any preceding embodiment, wherein said wireless communication circuit is a multiple-input-multiple-output (MIMO) wireless communication circuit, comprising: (a) a transmitter data processor which receives source data, processes it for transmission according to the routing protocol; (b) a transmitter spatial processor which spatially converts the output from said transmitter data processor to spatial outputs; (c) a plurality of modulators each receiving one of the spatial outputs and converting it to an analog TX signal; (d) an analog spatial processor coupled to multiple antennas, and configured for receiving said analog TX signal from each of said plurality of modulators and coupling this to the multiple antennas for wireless transmission; (e) a plurality of demodulators receiving analog input from said analog spatial processor, converting it to digital receiver signals; (f) a receiver spatial processor which receives digital receiver signals from said plurality of demodulators, and spatially processes them into a digital data output; and (g) a receiver data processor which receives digital data output from said receiver spatial processor from which it generates a sink data stream for output.

20. A method for wireless communication between stations, comprising: (a) communicating with the other wireless communication stations utilizing a routing protocol which controls a wireless communication circuit having a transmitter and receiver; (b) performing primary and secondary path discovery in establishing communications with a destination wireless communication station, through intermediate wireless communication stations; (c) determining by intermediate stations that secondary path segments are not part of the primary path and adjusting a path cost metric to assure said secondary path is independent of said primary path; and (d) transmitting data on the primary and the secondary path simultaneously.

Although the description herein contains many details, these should not be construed as limiting the scope of the disclosure but as merely providing illustrations of some of the presently preferred embodiments. Therefore, it will be appreciated that the scope of the disclosure fully encompasses other embodiments which may become obvious to those skilled in the art.

In the claims, reference to an element in the singular is not intended to mean "one and only one" unless explicitly so stated, but rather "one or more." All structural and functional equivalents to the elements of the disclosed embodiments that are known to those of ordinary skill in the art are expressly incorporated herein by reference and are intended to be encompassed by the present claims. Furthermore, no element, component, or method step in the present disclosure is intended to be dedicated to the public regardless of whether the element, component, or method step is explicitly recited in the claims. No claim element herein is to be construed as a "means plus function" element unless the element is expressly recited using the phrase "means for". No claim element herein is to be construed as a "step plus function" element unless the element is expressly recited using the phrase "step for".

What is claimed is:

1. A wireless communication apparatus, comprising:
   (a) a wireless communication circuit configured for wirelessly communicating with other wireless communication stations;
   (b) a computer processor coupled to said wireless communication circuit; and
   (c) a non-transitory computer-readable memory storing instructions executable by the computer processor;
   (d) wherein said instructions, when executed by the computer processor, perform steps comprising:
      (i) communicating with the other wireless communication stations utilizing a routing protocol;
      (ii) performing primary path discovery for a multiple-input-multiple-output (MIMO) capable source wireless communication station by sending an extended routing request (RREQ) containing a primary route flag and multiple-input-multiple-output (MIMO) capability information, or sending a conventional (non-extended) routing request (RREQ) for a source wireless communication station which is only single-input-single-output (SISO) capable, in establishing communications from the source wireless communication station to a destination wireless communication station, through intermediate wireless communication stations;
      (iii) receiving an extended routing reply (RREP), to an extended routing request (RREQ), from the destination wireless communication station if the destination wireless communication station is multiple-input-multiple-output (MIMO) capable, or receiving a conventional (non-extended) routing reply (RREP) if either a conventional (non-extended) routing request (RREQ) was sent or if the destination wireless communication station is only single-input-single-output (SISO) capable, whereby a single stream data transmission can commence;
      (iv) performing secondary path discovery, in response to receiving an extended routing reply from the multiple-input-multiple-output (MIMO) capable destination wireless station, by sending an extended routing request (RREQ) containing a secondary route flag and multiple-input-multiple-output (MIMO) capability information in establishing communications along a secondary path;
      (v) determining by intermediate wireless communication stations taking a localized action in recognizing that secondary path segments are not part of the primary path and adjusting a path cost metric to secure said secondary path as independent of said primary path, and adjusting the cost metric in response to determining signal processing capability, comprising determining if those stations are either single-input-single-output (SISO) or multiple-input-multiple-output (MIMO) capable; and
      (vi) transmitting data from the source wireless communication station on the primary and the secondary path simultaneously, toward the destination wireless communication station, when both the source wireless communication station and the destination wireless communication station are configured for multiple-input-multiple-output (MIMO) communications.

2. The apparatus of claim 1:
wherein said extended routing request (RREQ) adds a route indicator and multiple-input-multiple-output (MIMO) capability information to the addressing information of a conventional (non-extended) routing request (RREQ);
wherein said instructions when executed by the computer processor are configured for causing an intermediate wireless communication station receiving an extended routing request (RREQ) containing a secondary route flag to adjust path cost metric for an independent next hop and broadcasting this extended routing request (RREQ) to neighboring stations if no previous routing reply (RREP) was received having identical addressing as the received extended routing request (RREQ).

3. The apparatus of claim 1, wherein said routing protocol is an extension of an ad-hoc on-demand distance vector (AODV) routing protocol.

4. The apparatus of claim 1, wherein said extended routing request (RREQ) and said extended routing reply (RREP) are configured with different sequence identifiers than conventional (non-extended) routing request (RREQ) and routing reply (RREP), allowing stations to distinguish whether conventional or extended routing messages are being communicated.

5. The apparatus of claim 1, wherein said instructions when executed by the computer processor are configured for utilizing said extended routing request (RREQ) and routing reply (RREP) information elements which contain a distinct extended identifier which differentiates them from a conventional (non-extended) routing request (RREQ) and routing reply (RREP), and each contain a routing flag indicating a selection between a primary routing path and a secondary routing path.

6. The apparatus of claim 5, wherein said instructions when executed by the computer processor are configured for utilizing the conventional routing request (RREQ) when the wireless communication circuit is operating as a source wireless communication station which lacks multiple-input-multiple-output (MIMO) capability.

7. The apparatus of claim 5, wherein said instructions when executed by the computer processor are configured for transmitting data along only the primary routing path if it is determined that the destination wireless communication station does not have multiple-input-multiple-output (MIMO) capability.

8. The apparatus of claim 1, wherein said instructions when executed by the computer processor are configured for operating in different modes, comprising source wireless communication station, intermediate wireless communication station, and destination wireless communication station, depending on what role said apparatus is fulfilling within a current communication context.

9. The apparatus of claim 1, wherein said wireless communication circuit comprises a single-input-single-output (SISO) wireless communication circuit.

10. The apparatus of claim 9, wherein said single-input-single-output (SISO) wireless communication circuit, comprises:
(a) a transmitter data processor which receives source data, processes it for transmission according to the routing protocol;
(b) a modulator receiving digital output from said transmitter data processor, converting it to an analog TX signal;
(c) an analog spatial processor coupled to multiple antennas, and configured for receiving said analog TX signal and coupling this to the multiple antennas for wireless transmission;
(d) a demodulator receiving analog input from said analog spatial processor, converting it to a digital signal; and
(e) a receiver data processor which receives digital signals from said demodulator, and generates a sink data stream for output.

11. The apparatus of claim 1, wherein said wireless communication circuit comprises a multiple-input-multiple-output (MIMO) wireless communication circuit.

12. The apparatus of claim 11, wherein said multiple-input-multiple-output (MIMO) wireless communication circuit, comprises:
(a) a transmitter data processor which receives source data, processes it for transmission according to the routing protocol;
(b) a transmitter spatial processor which spatially converts the output from said transmitter data processor to spatial outputs;
(c) a plurality of modulators each receiving one of the spatial outputs and converting it to an analog TX signal;
(d) an analog spatial processor coupled to multiple antennas, and configured for receiving said analog TX signal from each of said plurality of modulators and coupling this to the multiple antennas for wireless transmission;
(e) a plurality of demodulators receiving analog input from said analog spatial processor, converting it to digital receiver signals;
(f) a receiver spatial processor which receives digital receiver signals from said plurality of demodulators, and spatially processes them into a digital data output; and
(g) a receiver data processor which receives digital data output from said receiver spatial processor from which it generates a sink data stream for output.

13. The apparatus of claim 1, wherein said apparatus is utilized in a communication application selected from the group of wireless communication applications consisting of: wireless local area networks (WLANs), wireless personal area networks (WPANs), wireless multiple hop relaying networks, peer-to-peer (P2P) communications, outdoor wireless communications, Wi-Fi networks, Internet of things (IoT) applications, backhauling of data by mesh networking, next generation cellular networks with D2D communications, 802.11 networks, and ZigBee.

14. A wireless communication apparatus, comprising:
(a) a wireless communication circuit configured for wirelessly communicating with other wireless communication stations;
(b) a computer processor coupled to said wireless communication circuit; and
(c) a non-transitory computer-readable memory storing instructions executable by the computer processor;
(d) wherein said instructions, when executed by the computer processor, perform steps comprising:
(i) communicating with the other wireless communication stations utilizing a routing protocol;
(ii) performing primary path discovery for a multiple-input-multiple-output (MIMO) capable source wireless communication station by sending an extended routing request (RREQ) containing a primary route indicator and multiple-input-multiple-output (MIMO) capability information, or sending a conventional (non-extended) routing request (RREQ) for a source wireless communication station which is only single-input-single-output (SISO) capable, in establishing communications from the source wireless communication station to the destination wireless communication station, through intermediate wireless communication stations;

(iii) wherein performing primary and secondary path discovery is performed in response to utilizing extended routing request (RREQ) and extended routing reply (RREP) information elements sent to neighboring stations, which extend the conventional RREQ and RREP information elements by adding a routing flag indicating a selection between a primary routing path and a secondary routing path, and utilizing different sequence identifiers than a non-extended routing request (RREQ) and non-extended routing reply (RREP), allowing stations to distinguish whether conventional or extended routing messages are being communicated;

(iv) receiving an extended routing reply (RREP) from the destination wireless communication station which indicates that the destination wireless communication station is capable of performing multiple-input-multiple-output (MIMO) communications;

(v) performing secondary path discovery, in response to the destination wireless communication station being capable of performing multiple-input-multiple-output (MIMO) communications, by sending an extended routing request (RREQ) containing a secondary route indicator and MIMO capability information in establishing communications along a secondary path with the destination wireless communication station;

(vi) wherein intermediate wireless communication stations receiving an extended routing request (RREQ) containing a secondary route indicator, perform adjusting path cost for an independent next hop and broadcasting this extended routing request (RREQ) to neighboring stations if no previous routing reply (RREP) was received with the same addressing as the received extended routing request (RREQ);

(vii) determining by intermediate stations taking a localized action in recognizing that secondary path segments are not part of the primary path and adjusting a path cost metric to secure said secondary path as independent of said primary path, and adjusting the cost metric according to whether stations along that route are single-input-single-output (SISO) or multiple-input-multiple-output (MIMO) capable; and (viii) transmitting data from the source wireless communication station on the primary and the secondary path simultaneously, toward the destination wireless communication station, when both the source wireless communication station and the destination wireless communication station are configured for multiple-input-multiple-output (MIMO) communications.

15. The apparatus of claim 14, wherein said instructions when executed by the computer processor are also configured for utilizing the conventional routing request (RREQ) when the wireless communication circuit is operating as a source wireless communication station which lacks multiple-input-multiple-output (MIMO) capability.

16. The apparatus of claim 14, wherein said instructions when executed by the computer processor are also configured for transmitting data along only the primary routing path if it is determined that the destination wireless communication station does not have multiple-input-multiple-output (MIMO) capability.

17. The apparatus of claim 14, wherein said instructions when executed by the computer processor are configured for operating in different modes, comprising source wireless communication station, intermediate wireless communication station, and destination wireless communication station, depending on what role said apparatus is fulfilling within a current communication context.

18. The apparatus of claim 14, wherein said wireless communication circuit comprises a single-input-single-output (SISO) wireless communication circuit, comprising:
(a) a transmitter data processor which receives source data, processes it for transmission according to the routing protocol;
(b) a modulator receiving digital output from said transmitter data processor, converting it to an analog TX signal;
(c) an analog spatial processor coupled to multiple antennas, and configured for receiving said analog TX signal and coupling this to the multiple antennas for wireless transmission;
(d) a demodulator receiving analog input from said analog spatial processor, converting it to a digital signal; and
(e) a receiver data processor which receives digital signals from said demodulator, and generates a sink data stream for output.

19. The apparatus of claim 14, wherein said wireless communication circuit is a multiple-input-multiple-output (MIMO) wireless communication circuit, comprising:
(a) a transmitter data processor which receives source data, processes it for transmission according to the routing protocol;
(b) a transmitter spatial processor which spatially converts the output from said transmitter data processor to spatial outputs;
(c) a plurality of modulators each receiving one of the spatial outputs and converting it to an analog TX signal;
(d) an analog spatial processor coupled to multiple antennas, and configured for receiving said analog TX signal from each of said plurality of modulators and coupling this to the multiple antennas for wireless transmission;
(e) a plurality of demodulators receiving analog input from said analog spatial processor, converting it to digital receiver signals;
(f) a receiver spatial processor which receives digital receiver signals from said plurality of demodulators, and spatially processes them into a digital data output; and
(g) a receiver data processor which receives digital data output from said receiver spatial processor from which it generates a sink data stream for output.

20. A method for wireless communication between stations, comprising:
(a) communicating with the other wireless communication stations utilizing a routing protocol which controls a wireless communication circuit having a transmitter and receiver;
(b) performing primary path discovery by sending an extended routing request (RREQ) containing a primary route indicator and MIMO capability information in establishing communications from the source wireless communication station to destination wireless communication station, through intermediate wireless communication stations;
(c) receiving an extended routing reply (RREP) from the destination wireless communication station which indicates that the destination wireless communication station is capable of performing multiple-input-multiple-output (MIMO) communications;
(d) performing secondary path discovery, in response to the destination wireless communication station being capable of performing multiple-input-multiple-output (MIMO) communications, by sending an extended routing request (RREQ) containing a secondary route indicator and MIMO capability information in establishing communications along a secondary path with the destination wireless communication station;
(e) determining by intermediate stations that secondary path segments are not part of the primary path and adjusting a path cost metric to secure said secondary path as independent of said primary path, and adjusting the cost metric according to whether stations along that route are single-input-single-output (SISO) or multiple-input-multiple-output (MIMO) capable; and
(f) transmitting data from the source wireless communication station on the primary and the secondary path simultaneously, toward the destination wireless communication station, when both the source wireless communication station and the destination wireless communication station are configured for multiple-input-multiple-output (MIMO) communications.

* * * * *